US006322087B1

United States Patent
Swensen et al.

(10) Patent No.: US 6,322,087 B1
(45) Date of Patent: Nov. 27, 2001

(54) METALLIC SEAL FOR LOW LOAD CONDITIONS

(75) Inventors: Jeffery E. Swensen, Eldersburg, MD (US); Peter C. Hall, Arlington, VA (US); Edward P. Rhyne, Columbia; Terence J. Nolan, Eldersburg, both of MD (US)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 09/365,834

(22) Filed: Aug. 3, 1999

Related U.S. Application Data

(63) Continuation-in-part of application No. 09/143,383, filed on Aug. 28, 1998.

(51) Int. Cl.$^7$ .................................................. F16J 15/08
(52) U.S. Cl. .................... 277/626; 277/608; 277/644; 277/653
(58) Field of Search .................................. 277/608, 614, 277/626, 644, 647, 653, 942

(56) References Cited

U.S. PATENT DOCUMENTS

| | | | |
|---|---|---|---|
| 3,520,544 | 7/1970 | Taylor | 277/206 |
| 3,595,588 * | 7/1971 | Rode | 277/614 |
| 3,797,836 * | 3/1974 | Halliing | 277/608 |
| 4,067,585 | 1/1978 | Rode | 277/200 |
| 4,121,843 * | 10/1978 | Halling | 277/208 |
| 4,361,335 | 11/1982 | Vinciguerra | 277/204 |
| 4,915,397 | 4/1990 | Nicholson | 277/206 R |
| 5,630,593 | 5/1997 | Swensen et al. | 277/206 R |
| 5,716,052 | 2/1998 | Swensen et al. | 277/27 |
| 5,730,445 | 3/1998 | Swensen et al. | 277/207 A |
| 5,799,954 * | 9/1998 | Layer | 277/626 |

FOREIGN PATENT DOCUMENTS

| | | |
|---|---|---|
| 0029101 | 5/1981 | (EP) . |
| 0692660 | 1/1996 | (EP) . |
| 2038961 | 7/1980 | (GB) . |
| 2189850 | 11/1987 | (GB) . |
| 2190154 | 11/1987 | (GB) . |
| 2291143 | 1/1996 | (GB) . |
| 2321285 | 7/1998 | (GB) . |

\* cited by examiner

*Primary Examiner*—Anthony Knight
*Assistant Examiner*—Enoch E Peavey
(74) *Attorney, Agent, or Firm*—Shinjyu Global IP Counselors, LLP

(57) ABSTRACT

A sealing ring is provided that can be used at low load conditions. The sealing ring basically has an annular center section, a first annular end section and second annular end section. The center section has a first end, a second end and a curved bight portion located between the first and second ends of the center section. The first annular end section extends from the first end of the center section. The first end section has a first axially extending leg portion and a first sealing surface facing in a first direction substantially parallel to a main central axis of the sealing ring. The second annular end section extends from the second end of the center section. The second end section has a second axially extending leg portion and a second sealing surface facing in a second direction substantially parallel to the main central axis of the sealing ring. In certain applications, the sealing ring can be provided with a coating of soft material or a second ply of soft material. The sealing ring can include a coating, such as a metallic or elastomeric coating, which can improve the integrity of the seals created as the sealing surfaces.

33 Claims, 17 Drawing Sheets

METALLIC SEAL FOR LOW LOAD CONDITIONS

CROSS-REFERENCE TO RELATED APPLICATIONS

This application is a continuation-in-part application of U.S. patent application Ser. No. 09/143,383, filed on Aug. 28, 1998. The entire disclosure of U.S. patent application Ser. No. 09/143,383 is hereby incorporated herein by reference.

BACKGROUND OF THE INVENTION

1. Field of the Invention

This invention generally relates to a metallic seal for low load conditions. More specifically, the present invention relates to a metallic sealing ring for creating a seal between opposing surfaces at low load conditions.

2. Background Information

Many different types of sealing devices exist for sealing two opposing surfaces, such as opposing pipe ends in a pipe coupling joint, a pipe end and capping arrangement, and so on. Known seals include metallic sealing devices, which are commonly made of materials such as soft iron, carbon steel, stainless steel, high nickel alloy, Inconel or Nimonic alloys. To improve their sealing ability, the sealing surfaces of these known metallic seals can be coated with a deformable material, such as PTFE, gold, silver, copper, and the like.

Known metallic seals can be, for example, ring or annularly shaped, such as a metallic O-ring, and can have cross-sections of various shapes. For example, a "C" seal or spring-energized "C" seal is typically an annular seal having a "C" shaped cross-section. Known "E" seals are generally annular in configuration and have an "E" shaped cross-section. Other types of metallic seals having cross-sections which are parabolic, convoluted, Y-shaped, or omega-shaped (Ω-shaped) are also known.

Although metallic seals of the type described above generally can function suitably in certain applications, these types of metallic seals have several drawbacks. In particular, these types of seals generally require application of a relatively large load force (e.g., 100 to several thousand pounds per circumferential inch, pci) to achieve a desired seal integrity, thus making these types of seals impractical for use in environments unable to withstand a large load force. Also, the low load seals mentioned above, such as the E-seal and Y-seal, are incapable of being made to seal to high vacuum levels. Bolts or other types of clamping devices are needed to apply the large load force, which complicates the sealing arrangement. Hence, these types of seals generally will not provide a desired sealing integrity in a vacuum-type sealing arrangement in which no bolts or clamps are used. Furthermore, these types of seals generally have a low or moderate aspect ratio of height to width, thereby making them impractical for use in narrow sealing regions.

Examples of known seals are disclosed in U.S. Pat. No. 5,730,445 to Swensen et al.; U.S. Pat. No. 4,915,397 to Nicholson; U.S. Pat. No. 4,067,585 to Rode; U.S. Pat. No. 3,520,544 to Taylor; and published European Patent Application No. 692660A1 to Nicholson.

Accordingly, a continuing need exists for a seal, in particular, a metallic seal, capable of providing a reliable seal at low load conditions and which overcomes the above mentioned problems in the prior art. This invention addresses this need in the prior art as well as other needs, which will become apparent to those skilled in the art from this disclosure.

SUMMARY OF THE INVENTION

One object of the present invention is to provide a sealing ring that can be used at low load conditions and provide high reliability.

Another object of the present invention is to provide a sealing ring that can be used in vacuum or pneumatic applications.

Yet another object of the present invention is to provide a sealing ring having a high aspect ratio of height to width, so that the sealing ring can be used in narrow sealing regions.

Still another object of the present invention is to provide a sealing ring that may be produced in a variety of configurations, including circular and non-circular configurations with a variety of axial heights.

Another object of the present invention is to provide a metallic sealing ring that creates a high integrity seal at ultra high vacuum levels with a leak rate of less than $1\times10^{-9}$ scc/s He, and without the use of supplemental bolt loading.

Yet still another object of the present invention is to provide a sealing ring that has a narrow band for producing a high quality sealing dam over a sufficient width to minimize leakage on a molecular level.

The foregoing objects can basically be attained by providing a sealing ring that comprises an annular center section, a first annular end section and second annular end section. The center section has a first end, a second end and a curved bight portion located between the first and second ends of the center section. The first annular end section extends from the first end of the center section. The first end section has a first leg portion extending axially from the first end of the center section with a first sealing surface formed at its outer axial end. The first leg portion is substantially straight in cross-section and substantially parallel to a main central axis of the sealing ring. The second annular end section extends from the second end of the center section. The second end section has a second leg portion extending axially from the second end of the center section with a second sealing surface formed at its outer axial end. The second leg portion is substantially straight in cross-section and substantially parallel to the main central axis of the sealing ring.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
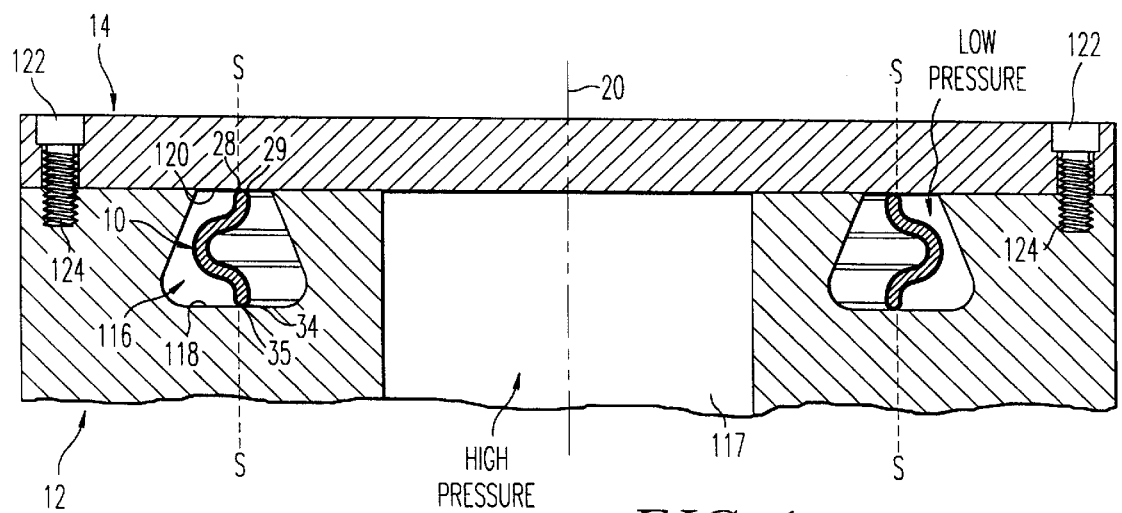
FIG. 1 is a cross-sectional view of a seal or sealing ring in accordance with an embodiment of the present invention, which is shown installed in a groove at the end of a pipe to which is coupled a cap.
Figure 2:
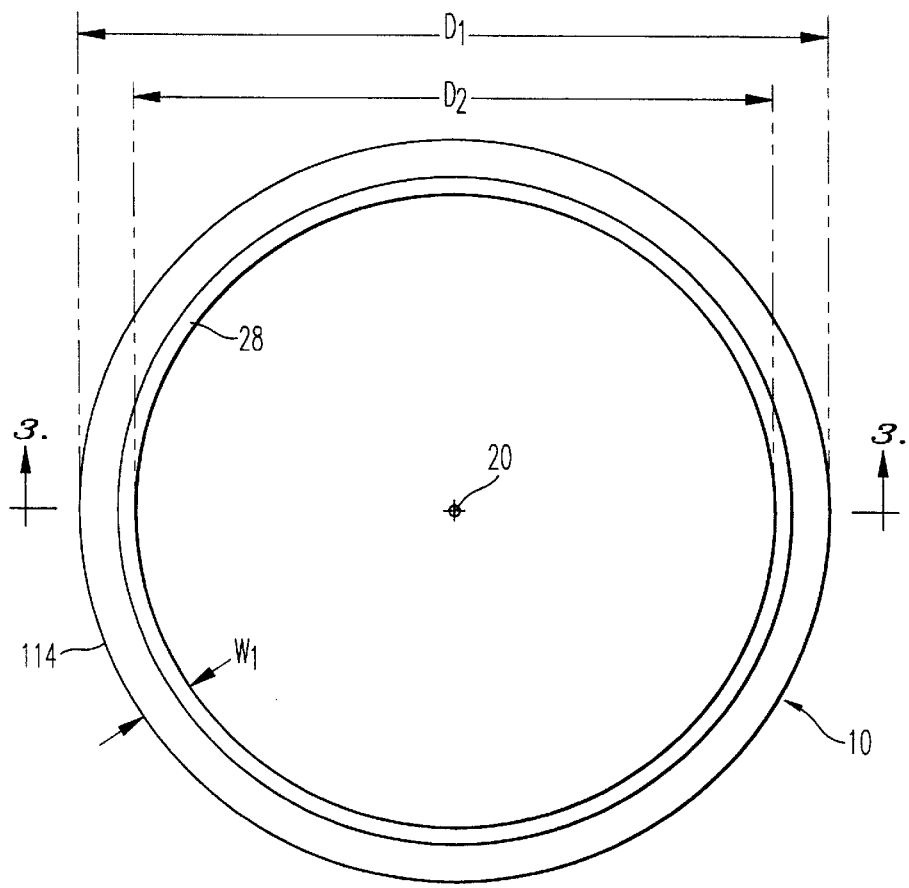
FIG. 2 is top plan view of the seal or sealing ring as shown in FIG. 1.
Figure 3:
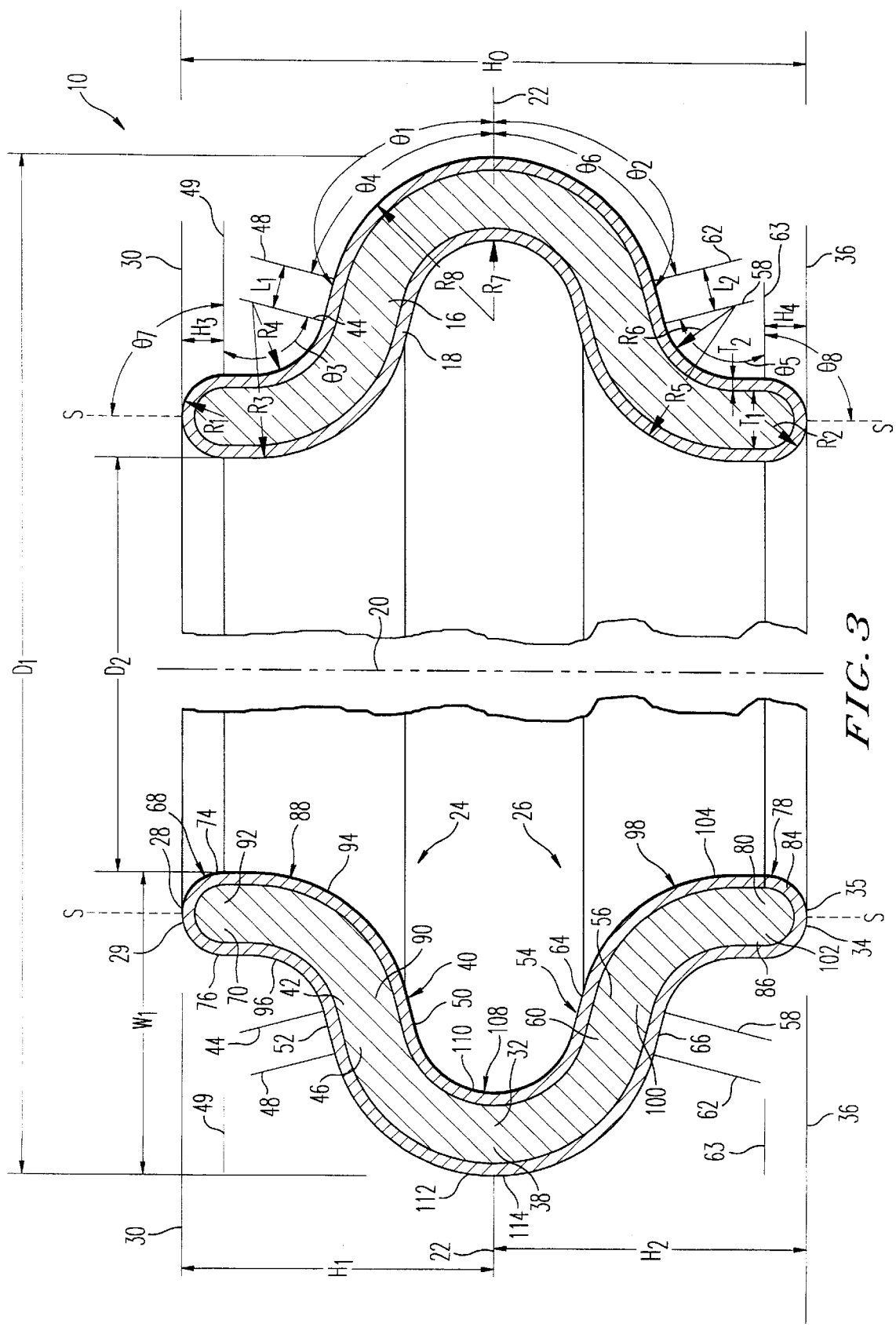
FIG. 3 an enlarged, partial longitudinal cross-sectional view of the seal or sealing ring illustrated in FIGS. 1 and 2 taken along section line 3—3 of FIG. 2.

Referring to FIGS. 1–3, a sealing ring 10 in accordance with the present invention is shown sealing the opposing surfaces of a pipe end 12 and cap 14 attached thereto. The sealing ring 10 includes a base material 16, preferably formed of metal, such as a high strength alloy, Inconel 718 or Inconel X-750, or a relatively softer metal, such as aluminum, or a tribalogically compatible material, in applications where a coating is not used. The metal forming base material 16 of sealing ring 10 can have a thickness $T_1$ ranging from about 0.008 inch to about 0.025 inch, or any other suitable thickness depending on the type of material and the application for which the sealing ring 10 is to be used. Also, the material forming sealing ring 10 is not limited to metal, but can be any other suitable material.

Depending on the type of base material 16 used to form sealing ring 10, sealing ring 10 can include a coating 18 of a relatively softer metal, such as tin, nickel, or the like, or any other suitable material, such as an elastomer or the like, which covers all or substantially all of base material 16. That is, as explained in more detail below, when the base material 16 is formed of a harder metal such as a high strength alloy, Inconel 718 or Inconel X-750, the softer coating 18 is desirable to improve seal integrity. For exemplary purposes, FIG. 3 shows the sealing ring 10 with coating 18. The dimensions and angles pertaining to the different sections and portions of the sealing ring 10 as discussed below would be substantially similar for a sealing ring 10 not having a coating 18.

The coating 18 can be coated to the base material 16 by any known process, such as electro-depositing or the like for metal coatings, and generally has a thickness $T_2$ within the range of about 0.001 inch to about 0.006 inch. However, the coating 18 can have any suitable thickness, depending on the application in which the sealing ring 10 is to be used. Furthermore, the thickness $T_2$ of the coating 18 can vary at different locations on the base material 16. For example, due to an end effect that occurs with an electro-depositing process, the coating thickness can be greater at the distal ends of the base material 16. However, as can be appreciated from the description below, this increased thickness of the coating 18 can be beneficial in improving seal integrity.

Figure 9:
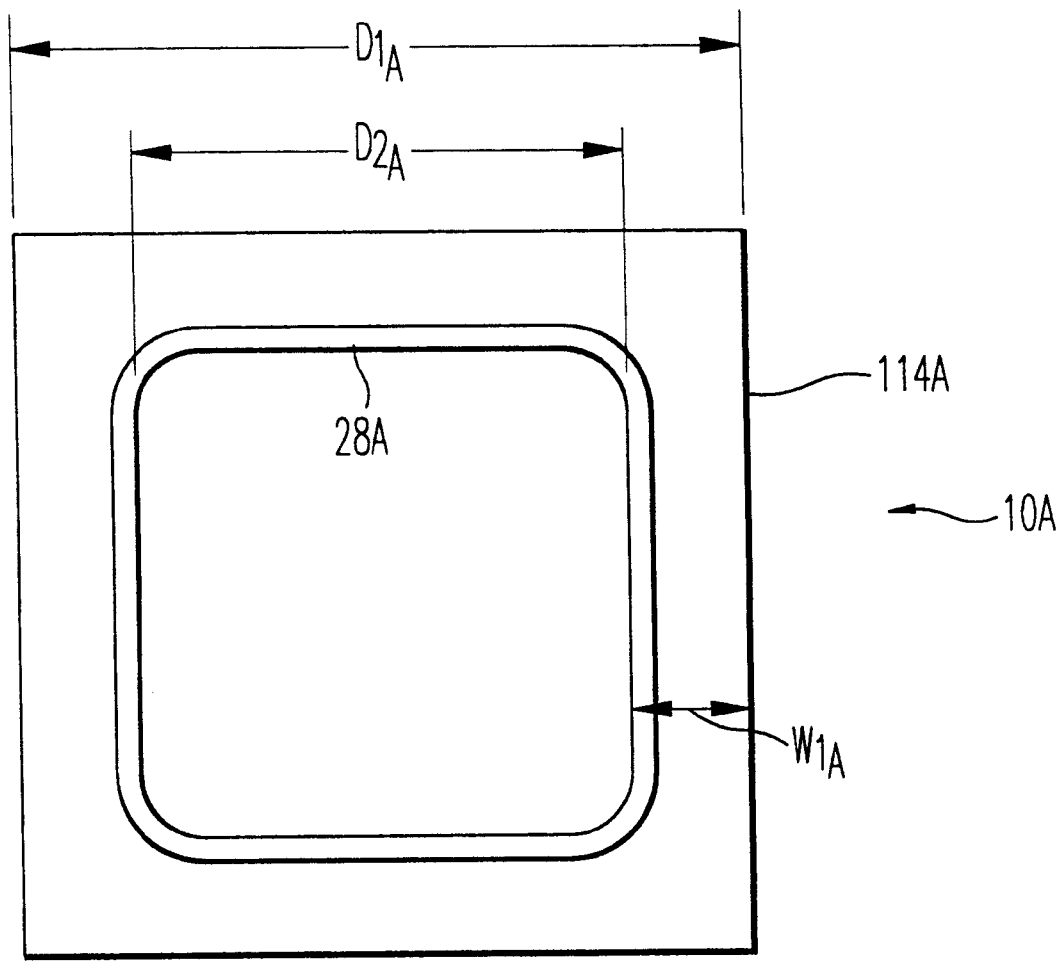
FIG. 9 is a top plan view of a seal or sealing ring according to an alternate embodiment of the present invention.

As shown, in particular, in FIGS. 2 and 3, sealing ring 10 is a one-piece structure, generally ring-shaped or annular about a longitudinal or central axis 20, which extends along the longitudinal center of the seal. However, the sealing ring 10 need not be circularly shaped as shown, but rather, can have any shape which encompasses longitudinal axis 20, such as oval or "race-track", square, rectangular, polygonal, or any other suitable encompassing shape (a square-shaped seal is shown in FIG. 9 as discussed below). In this example, the seal has an outer diameter $D_1$, an inner diameter $D_2$, and a width $W_1$, which are measured as shown. The outer diameter $D_1$ can be within a range of about 0.50 inch to about 30 inches or more, depending on the type of application, and the inner diameter $D_2$ can be within a range of about 0.50 inch to about 30 inches or more, depending on the type of application, with the width $W_1$ being proportionately sized. In one example, diameter $D_1$ is about 9.000 inches, diameter $D_2$ is about 8.871 inches, and width $W_1$ is about 0.064 inch. However, the diameters $D_1$ and $D_2$, and the width $W_1$ can have any dimensions suitable to perform the functions of the sealing ring 10 discussed below.

As shown in detail in FIG. 3, sealing ring 10 has a U-shaped or substantially U-shaped cross-section. In particular, sealing ring 10 can be symmetrical or substantially symmetrical about a central plane 22, which extends perpendicular or substantially perpendicular to longitudinal axis 20. Central plane 22 divides sealing ring 10 into a first section 24 and a second section 26, which are integrally formed together. However, sealing ring 10 need not be symmetrical about central plane 22.

First section 24 extends from a free first end 28, which is in first plane 30 parallel or substantially parallel to central plane 22, to a second end 32, which is in or substantially in the central plane 22. Free first end 28 includes a first sealing surface 29 of sealing ring 10, which extends normal or substantially normal to longitudinal axis 20, and forms a sealing line S about the free first end 28, the significance of which is described in detail below. Also, when sealing ring 10 is in a non-compressed state, the height $H_1$ of first section 24 taken between central plane 22 and first plane 30 can be within a range of 0.050 inch to 0.200 inch, or more or less, depending on the type of application. In one example, the height $H_1$ is 0.076 inch. However, the height $H_1$ varies in proportion with the overall height $H_0$ of the seal.

Second section 26 extends from a free third end 34, which is in a second plane 36 parallel or substantially parallel to central plane 22, to a fourth end 38, which is in or substantially in the central plane 22, and connects to the second end 32 of first section 24 to thus connect second section 26 to first section 24. Free third end 34 includes a second sealing surface 35 of sealing ring 10, which extends normal or substantially normal to longitudinal axis 20 and forms the sealing line S about the free third end 34, the significance of which is described in detail below. Also, when sealing ring 10 is in a non-compressed state, the overall height $H_2$ of second section 26 taken between central plane 22 and second plane 36 can be within a range of about 0.050 inch to about 0.200 inch, or more or less, depending on the type of application. In one example, the height $H_2$ is about 0.076 inch. However, the height $H_2$ varies in proportion to the overall height $H_0$ of the sealing ring 10.

Accordingly, when sealing ring 10 is in a non-compressed state, the overall height $H_0$ of sealing ring 10 is $H_1+H_2$, which can be within a range of 0.100 to 0.400 inch, or more or less depending on the type of application. In the example given above in which the width $W_1$ is 0.064 inch, the overall height $H_0$ is 0.152 inch. In accordance with one aspect of the present invention, the aspect ratio of the overall height $H_0$ of sealing ring 10 to the overall width $W_1$ preferably is within the range of about 1.5 to about 5.0, which provides sealing ring 10 with a sufficient rigidity to minimize damage of the sealing ring 10 due to kinking, bending and the like during normal handling, while also enabling the first and second sealing ends 29 and 35, respectively, to create a high integrity seal which has a leak rate of less than $1\times10^{-9}$ scc/s He, and provides a vacuum or pressure tight connection at $1\times10^{-10}$ torr pressure levels or below.

First section 24 includes a first straight or substantially straight portion 40, which extends a length $L_1$ from a fifth end 42 in a third reference line 44 to a sixth end 46 in fourth reference line 48. As shown, straight portion 40 extends generally at a first angle $\theta_1$ with respect to central plane 22, and therefore, extends at an angle $|90°-\theta_1|$ with respect to longitudinal axis 20. First angle $\theta_1$ in this embodiment is typically an obtuse angle within the range of 90°–180°, but can by any suitable angle.

Third reference line 44 extends at a third angle $\theta_3$ with respect to fifth reference line 49, which can be parallel or substantially parallel to the central plane 22, and fourth reference line 48 extends at a fourth angle $\theta_4$ with respect to the central plane 22. The fifth reference line 49 can extend at an angle of up to about ±30° with respect to the central plane 22. It is noted that third reference line 44, fourth reference line 48 and fifth reference line 49 extend at their respective angles regardless of where the cross-section is taken along the sealing ring 10. The value of third angle $\theta_3$ can be within the range of 0° to about 120°, depending on the value of $\theta_4$ and the angle at which fifth reference line 49 extends with respect to central plane 22. The value of fourth angle $\theta_4$ can be within the range of 0° to about 90°. In the example given above, third angle $\theta_3$ has a value of about 90°, and fourth angle $\theta_4$ has a value of about 80°.

Straight portion 40 includes a first straight or substantially straight surface 50 and a second straight or substantially straight surface 52. In this configuration, the first substantially straight surface 50 is an inner surface making up part of the inner surface of the sealing ring 10, and the second substantially straight surface 52 is an outer surface making up part of the outer surface of sealing ring 10. When sealing ring 10 is in an uncompressed state, the overall length $L_1$ of first substantially straight portion 40 taken between third reference line 44 and fourth reference line 48 can be within the range of 0 to about 0.10 inch, or more or less depending on the application. In the example give above, the length $L_1$ is about 0.006 inch. Also, as shown, first substantially straight portion 40 extends at or substantially at the first angle $\theta_1$ with respect to central plane 22.

Second section 26 includes a second straight or substantially straight portion 54, which extends a length $L_2$ from a seventh end 56 in sixth reference line 58, to an eighth end 60 in seventh reference line 62. As shown, straight portion 54 extends generally at a second angle θ2 with respect to central plane 22, and therefore, extends at an angle $|90°-\theta_2|$ with respect to longitudinal axis 20. Second angle $\theta_2$ in this embodiment is typically an obtuse angle within the range of 90°–180°, but can be any suitable angle. Sixth reference line 58 extends at a fifth angle θ5 with respect to an eighth reference line 63, which can be parallel or substantially parallel to the central plane 22, and seventh reference line 62 extends at a sixth angle $\theta_6$ with respect to the central plane 22. The eighth reference line 63 can extend at an angle of up to about ±30° with respect to the central plane 22. It is noted that sixth reference line 58, seventh reference line 62 and eighth reference line 63 extend at their respective angles regardless of where the cross-section is taken along the sealing ring 10. The value of fifth angle $\theta_5$ can be within the range of 0° to about 120°, depending on the value of $\theta_6$ and the angle at which eighth reference line 63 extends with respect to central plane 22. The value of sixth angle $\theta_6$ can be within the range of 0° to about 90°. In the example given above, fifth angle $\theta_5$ has a value of about 90°, and sixth angle $\theta_6$ has a value of about 80°.

Second portion 54 includes a third straight or substantially straight surface 64 and a fourth straight or substantially straight surface 66. In this configuration, the third substantially straight surface 64 is an inner surface making up part of the inner surface of the sealing ring 10, and the fourth substantially straight surface 66 is an outer surface making up part of the outer surface of sealing ring 10. When sealing ring 10 is in an uncompressed state, the overall length $L_2$ of second substantially straight portion 54 taken between sixth reference line 58 and seventh reference line 62 can be within a range of 0 to about 0.100 inch, or more or less depending on the application. In the example give above, length $L_2$ is about 0.006 inch. Also, as shown, second substantially straight portion 54 extends at or substantially at the second angle $\theta_2$ with respect to central plane 22.

First section 24 further includes a third portion 68, which extends from the free first end 28 of first section 24, to a ninth end 70 in fifth line 49, which is parallel or substantially parallel to the central plane 22. Third portion 68 includes a fifth straight or substantially straight surface 74 and a sixth straight or substantially straight surface 76. In this configuration, the fifth substantially straight surface 74 is an inner surface making up part of the inner surface of the sealing ring 10, and the sixth substantially straight surface 76 is an outer surface making up part of the outer surface of sealing ring 10. Also, as fifth and sixth substantially straight surfaces 74 and 76, respectively, approach free first end 28, they each curve toward each other at a radius of curvature $R_1$ to form free first end 28. Radius of curvature $R_1$ can be within the range of about 0.004 inch to about 0.020 inch. In the example, given above, radius $R_1$ is about 0.010 inch.

When sealing ring 10 is in an uncompressed state, the overall height $H_3$ of third portion 68 taken between fifth reference line 49 and first plane 30 can be within a range of about 0.004 inch to about 0.100 inch, or more or less depending on the type of application. In the example given above, height $H_3$ is about 0.015 inch. Also, as shown, third portion 68 extends at or substantially at a seventh angle $\theta_7$ with respect to fifth reference line 49. In this example, angle $\theta_7$ is 90° or substantially 90°, but can be any suitable angle.

Second section 26 further includes a fourth portion 78, which extends from the free third end 34 of second section 26, to a tenth end 80 in eighth reference line 63, which is parallel or substantially parallel to the central plane 22. Fourth portion 78 includes a seventh straight or substantially straight surface 84 and an eighth straight or substantially straight surface 86. In this configuration, the seventh substantially straight surface 84 is an inner surface making up part of the inner surface of the sealing ring 10, and the eighth substantially straight surface 86 is an outer surface making up part of the outer surface of sealing ring 10. Also, as seventh and eighth substantially straight surfaces 84 and 86, respectively, approach free third end 34, they each curve toward each other at a radius of curvature $R_2$ to form free third end 34. In this example, radius of curvature $R_2$ can be within the range of about 0.004 inch to about 0.020 inch. In the example give above, radius $R_2$ is about 0.010 inch.

When sealing ring 10 is in an uncompressed state, the overall height $H_4$ of fourth portion 78 taken between eighth reference line 63 and second plane 36 can be within a range of about 0.004 inch to about 0.100 inch, or more or less depending on the type of application. In the example given above, height $H_4$ is about 0.015 inch. Also, as shown, fourth portion 78 extends at or substantially at an eighth angle $\theta_8$ with respect to eighth reference line 63. In this example, eighth angle $\theta_8$ is 90° or substantially 90°, but can be any suitable angle.

First section 24 further includes a fifth curved portion 88, which extends from an eleventh end 90, in or substantially in third reference line 44, to a twelfth end 92, in or substantially in fifth reference line 49. The eleventh and twelfth ends 90 and 92, respectively, of fifth curved portion 88 connect to the fifth end 42 of first substantially straight portion 40 and the ninth end 70 of third portion 68, respectively, to thereby connect fifth curved portion 88 to first portion 40 and third portion 68. Hence, first portion 40, fifth curved portion 88, and third portion 68 are an integral piece.

Fifth curved portion 88 includes a curved surface 94 which, in this example, is a convex curved surface, and a curved surface 96 which, in this example, is a concave curved surface. In this configuration, curved surface 94 makes up part of the inner surface of sealing ring 10, and curved surface 96 makes up part of the outer surface of sealing ring 10. When sealing ring 10 is in an uncompressed state, the radius of curvature $R_3$ of curved surface 94 can be within a range of about 0.008 inch to about is 0.060 inch, and the radius of curvature $R_4$ of curved surface 96 can be within a range of about 0.008 inch to about 0.090 inch. In the example give above, radius $R_3$ is about 0.041 inch and radius $R_4$ is about 0.020 inch. The arc lengths of curved surfaces 94 and 96 can be any suitable lengths depending on the outer dimension of the sealing ring 10.

Second section 26 further includes a sixth curved portion 98, which extends from a thirteenth end 100, in or substantially in sixth reference line 58, to a fourteenth end 102, in or substantially in eighth reference line 63. The thirteenth and fourteenth ends 100 and 102, respectively, of fifth curved portion 88 connect to the seventh end 56 of second substantially straight portion 54 and the tenth end 80 of fourth portion 78, respectively, to thereby connect sixth curved portion 98 to second portion 54 and fourth portion 78. Accordingly, second portion 54, sixth curved portion 98 and fourth portion 78 are an integral piece.

Sixth curved portion 98 includes a curved surface 104 which, in this example, is a convex curved surface, and a curved surface 106 which, in this example, is a concave curved surface. In this configuration, curved surface 104 makes up part of the inner surface of sealing ring 10, and curved surface 106 makes up part of the outer surface of sealing ring 10. When sealing ring 10 is in an uncompressed state, the radius $R_5$ of curvature of curved surface 104 can be within a range of about 0.008 inch to about 0.060 inch, and the radius of curvature $R_6$ of curved surface 106 can be within a range of about 0.008 inch to about 0.090 inch. In the example given above, radius $R_5$ is about 0.041 inches and radius $R_6$ is about 0.020 inch. The art lengths of curved surfaces 104 and 106 can be any suitable lengths dependent on the other dimension of the sealing ring 10.

Part of first section 24 extending between central plane 22 and fourth reference line 48, and part of second section 26 extending between central plane 22 and seventh reference line 62 make up a seventh curved surface 108. Specifically, seventh curved surface 108 extends between the fourth reference line 48 and seventh reference line 62 as shown, with the central plane 22 being the central plane or substantially the central plane of seventh curved surface 108.

Seventh curved surface 108 includes a curved surface 110 which, in this example, is a concave curved surface, and a curved surface 112 which, in this example, is a convex curved surface. In this configuration, curved surface 110 makes up part of the inner surface of sealing ring 10, and curved surface 112 makes up part of the outer surface of sealing ring 10. When sealing ring 10 is in an uncompressed state, the radius of curvature $R_7$ of curved surface 110 can be within a range of about 0.008 inch to about 0.060 inch, and the radius of curvature $R_8$ of curved surface 112 can be within a range of about 0.008 inch to about 0.090 inch. In the example given above, radius $R_7$ is about 0.020 inch and radius $R_8$ is about 0.041 inch. The arc lengths of curved surfaces 110 and 112 can be any suitable dimensions depending on the other dimensions of the sealing ring 10.

Accordingly, when the sealing ring 10 is configured as shown in FIGS. 1–3, the maximum diameter portion $D_1$ of sealing ring 10 is along central plane 22. Hence, the sealing ring 10 includes a main apex 114 at a point along its outer surface in the central plane 22 as shown, at which the overall diameter $D_1$ of the sealing ring 10 is measured. As further shown, the width $W_1$ is measured between apex 114 and the inner surface 74 of third portion 68, which is in the same or substantially the same plane as the inner surface 84 of fourth portion 78.

Referring to FIG. 1, pipe end 12 includes an annular groove or recess 116 having a depth and width sufficient to accommodate sealing ring 10 as shown, and which surrounds inner chamber 117 of the pipe. Annular groove 116 has a bottom surface 118 against which rests the free end and hence, the first sealing surface 29, or the free end 34 and hence, the second sealing surface 35 of sealing ring 10 when the sealing ring 10 is placed in groove 116. For exemplary purposes, sealing ring 10 is shown as being placed in annular groove 116 with the second sealing surface 35 contacting bottom surface 118 of groove 116. The bottom surface 118 can be metal, ceramic, or any other suitable material having any suitable surface finish or coarseness. In this example, the bottom surface 118 has a finish of 16 Ra, but can have any finish within the range of 0 to 70 Ra.

Cap 14 has an inner surface 120 which, in this example, contacts the first sealing surface 28 of sealing ring 10 when the seal 110 is placed in groove 116 of pipe end 12 and the cap 14 is attached to pipe end 12. The inner surface 120 can be metal or ceramic, for example, or any other suitable material having any suitable surface finish or coarseness. In this example, the inner surface 120 has a finish of 16 Ra, but can have any finish within the range of 0 to 90 Ra depending on the coating type and the desired sealing performance. Hence, sealing ring 10 can function to seal opposing surfaces which are metal to metal, metal to ceramic, ceramic to ceramic, or any other combination of materials. It is noted that inner surface 120 can also be recessed.

The cap 14 can be secured to pipe end 12 by, for example, bolts 122, which can pass through openings in the cap 14 and be received into aligning threaded openings 124 in pipe end 12 as shown. Other suitable types of fastening members, such as rivets, clamps, and the like, can also be used to secure cap 14 to pipe end 12. Furthermore, cap 14 can be held to pipe end 12 by a vacuum or negative pressure created in the chamber 117 of pipe end 12. Alternatively, the cap 14 and pipe end 12 can include mating threads (not shown) which enable the cap 14 to be screwed onto the pipe end 12.

As the cap 14 is secured to the pipe end 12 as shown, the bottom surface 118 exerts a force on second sealing surface 35, while inner surface 120 of cap 14 exerts a force on first sealing surface 29. These forces compress sealing ring 10, which causes the first and second sections 24 and 26 to plastically deform, such that the respective angles $\theta_1$ and $\theta_2$ at which first and second sections 24 and 26 extend with respect to central plane 22 decrease or, in other words, first and second sections 26 move angularly toward each other, which rolls surfaces 29 and 35 to corners, thus increasing the stress intensity factor.

Furthermore, since the first and second sealing surfaces 29 and 35 are at the free ends of the first and second sections 24 and 26, respectively, the forces or load imposed on sealing ring 10 are concentrated in narrow bands about the sealing ring 10 on each of the first and second sealing surfaces 29 and 35. The narrow band on each of the first and second sealing surfaces 29 and 35 has a very small width, usually within a range of about 0.010 inch to about 0.040 inch, and thus has a very small surface area, which creates high contact stress between the first and second sealing surfaces 29 and 35 and the inner surface 120 and bottom surface 118, respectively.

This high contact stress plastically deforms the first and second sealing surfaces 29 and 35, respectively, and creates a high quality sealing dam between the inner surface 120 and first sealing surface 29, and a high quality sealing dam between bottom surface 118 and second sealing surface 35, at sealing lines S. As discussed above, if the base material 16 is made of a relatively soft material, such as aluminum, the first and second sealing surfaces 29 and 35 are present on the base material 16 and thus, the base material is plastically deformed at the first and second sealing surfaces 29 and 35 to create the high quality sealing dams. However, if as in the example as shown, the base material 16 is a harder material, such as Inconel 718 or Inconel X-750 and is therefore coated with coating 18, the coating 18 plastically deforms to create the sealing dams at the sealing lines S as indicated.

In either case, the high quality sealing dams prevent leakage of fluid between the inner surface 120 and first sealing surface 28, and between bottom surface 118 and second sealing surface 35 on a molecular level (i.e., having a leak rate of less than $1\times10^{-9}$ scc/s He at pressures up to at least 100 psi He, and providing a vacuum or pressure tight connection at $1\times10^{-10}$ torr pressure levels). However, the leak rate could be more than $1\times10^{-9}$ scc/s He at pressures up to at least 100 psi (e.g., $1\times10^{-7}$ scc/s He at pressures up to at least 100 psi) if such a low leak rate is not necessary. Furthermore, it is noted that these high quality sealing dams are created at relatively low load forces, ranging upward from 40 pci. Accordingly, in the example in FIG. 1 in which the inner chamber 117 of pipe end 12 is the high pressure side of the sealing ring 10, the sealing ring 10 limits leakage from the inner chamber 117 through the spaces between bottom surface 118 and inner surface 120 to a rate of less than $1\times10^{-9}$ scc/s He.

It is noted when the sealing ring 10 is in a non-compressed state, angles $\theta_1$, $\theta_2$, $\theta_7$ and $\theta_8$ could be 90° or about 90°, angles $\theta_3$ through $\theta_6$ could be 0°, and the radii of curvatures $R_3$ through $R_8$ of the fifth, sixth and seventh curved surfaces could be substantially infinity. In this event, first and second sections 24 and 26 form a continuous or substantially continuous wall of sealing ring 10, such that sealing ring 10 is, for example, substantially cylindrical in shape (or has any other encompassing shape with straight walls, such as a square, rectangle, and on). Since the first and second sealing surfaces 29 and 35 are at the opposite longitudinal ends of sealing ring 10, sealing ring 10 having this cylindrical or otherwise straight-wall type configuration functions in the same or similar manner as described above to create sealing dams at the sealing lines S on surfaces 29 and 35, respectively. However, the U-shaped or V-shaped configuration of sealing ring 10 is desirable, particularly because the U-shape or V-shape controls the deflection of the first and second sections 24 and 26, and thus prevents uncontrolled buckling of the base material 16 and, if present, the coating 18.

Figure 4:
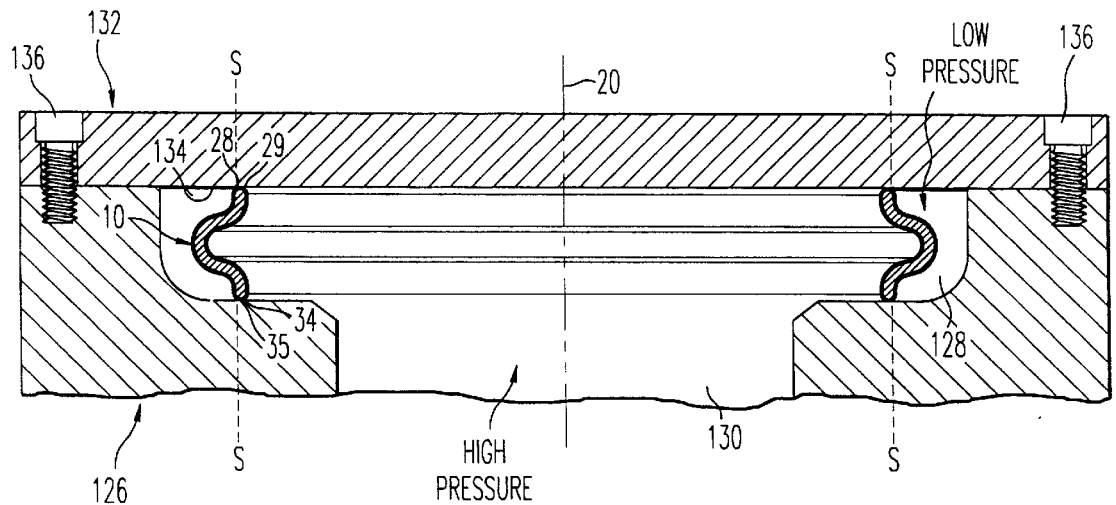
FIG. 4 is a cross-sectional view of a seal or sealing ring as shown in FIGS. 1–3, which is shown installed in a counterbored opening at the end of a pipe to which is coupled a cap.
Figure 5:
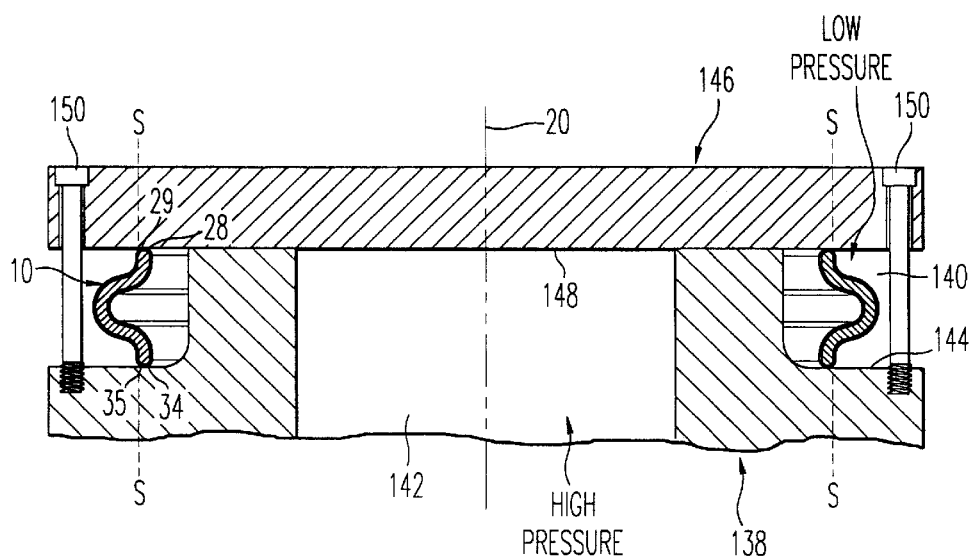
FIG. 5 is a cross-sectional view of a seal or sealing ring as shown in FIGS. 1–3, which is shown installed in a recess about the circumference of an end of a pipe to which is coupled a cap.

As shown in FIGS. 4 and 5, sealing ring 10 can be used in other types of sealing applications. For example, referring to FIG. 4, sealing ring 10 is loaded in a pipe end 126 having a counterbored end 128 surrounding an internal chamber 130. The counterbored end 128 has a bottom surface 132 against which rests one sealing surface (in this example, second sealing surface 35) of sealing ring 10.

As with pipe end 12, a cap 134, similar to cap 14, having an inner surface 136 is secured to pipe end 126 by, for example, bolts 136 or any other suitable fastening mechanism, or by a vacuum. Accordingly, inner surface 136 contacts the other sealing surface (first sealing surface 29) of sealing ring 10. It is noted that inner surface 136 could also be counterbored.

The force securing cap 134 to pipe end 126 causes inner surface 136 to exert a force on first sealing surface 29, and causes bottom surface 132 to exert a force on second sealing surface 35 in a manner similar to that described above with regard to bottom surface 118 and inner surface 120. Therefore, as in the example shown in FIG. 1, first and second sealing surfaces 29 and 35 plastically deform to create high integrity sealing dams which prevent leakage on a molecular level as described above. Since in this example, inner chamber 130 of pipe end 126 includes a high pressure, the sealing dams created by first and second sealing surfaces 29 and 35 prevent leakage between sealing surface 29 and inner surface 136, and between sealing surface 35 and bottom surface 132, at a leak rate lower than $1 \times 10^{-9}$ scc/s He.

Referring to FIG. 5, sealing ring 10 is loaded in a pipe end 138 having an external groove 140 surrounding pipe end 138, and an internal chamber 142. The external groove 140 has a bottom surface 144 against which rests one sealing surface (in this example, second sealing surface 35) of sealing ring 10.

As with pipe end 12, a cap 146, similar to cap 14, having an inner surface 148 is secured to pipe end 126 by, for example, bolts 150 or any other suitable fastening mechanism. Accordingly, inner surface 148 contacts the other sealing surface (first sealing surface 29) of sealing ring 10.

The force securing cap 146 to pipe end 126 causes inner surface 148 to exert a force on first sealing surface 29, and causes bottom surface 144 to exert a force on second sealing surface 35 in a manner similar to that described above with regard to bottom surface 118 and inner surface 120. Therefore, as in the example shown in FIG. 1, first and second sealing surfaces 29 and 35 plastically deform to create high integrity sealing dams which prevent leakage on a molecular level as described above. Hence, the sealing dams created by first and second sealing surfaces 29 and 35 prevent leakage between surfaces 29 and 136, and between surfaces 35 and 132, at a leak rate lower than $1 \times 10^{-9}$ scc/s He.

Other possible variations of the present invention includes a range of diameters, shapes, heights, coatings, base materials chosen for coefficient of thermal expansion matches, pressure or vacuum sealing, sealing any fluid by choosing compatible materials or any other variations typically used to configure a seal for a given application. Additional variations of sealing ring 10 will now be discussed in embodiments two through thirteen.

Second Embodiment

Figure 6:
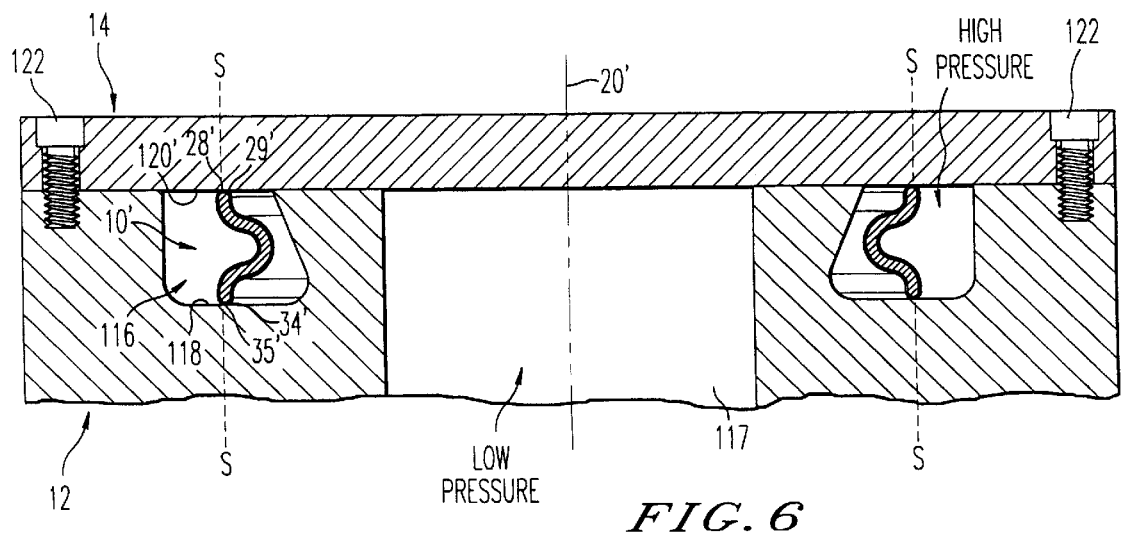
FIG. 6 is a cross-sectional view of the seal or sealing ring shown in FIGS. 1–3, modified in an inverted manner, and shown installed in a groove at the end of a pipe to which is coupled a cap.
Figure 7:
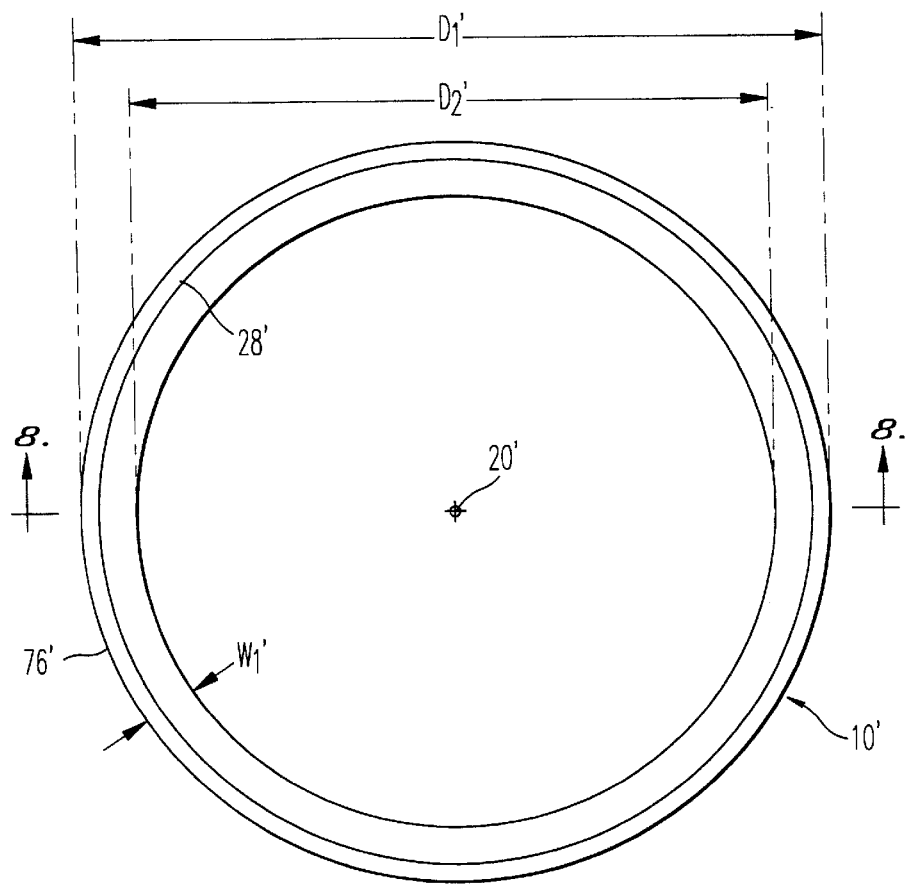
FIG. 7 a top plan view of the seal or sealing ring as shown in FIG. 6.
Figure 8:
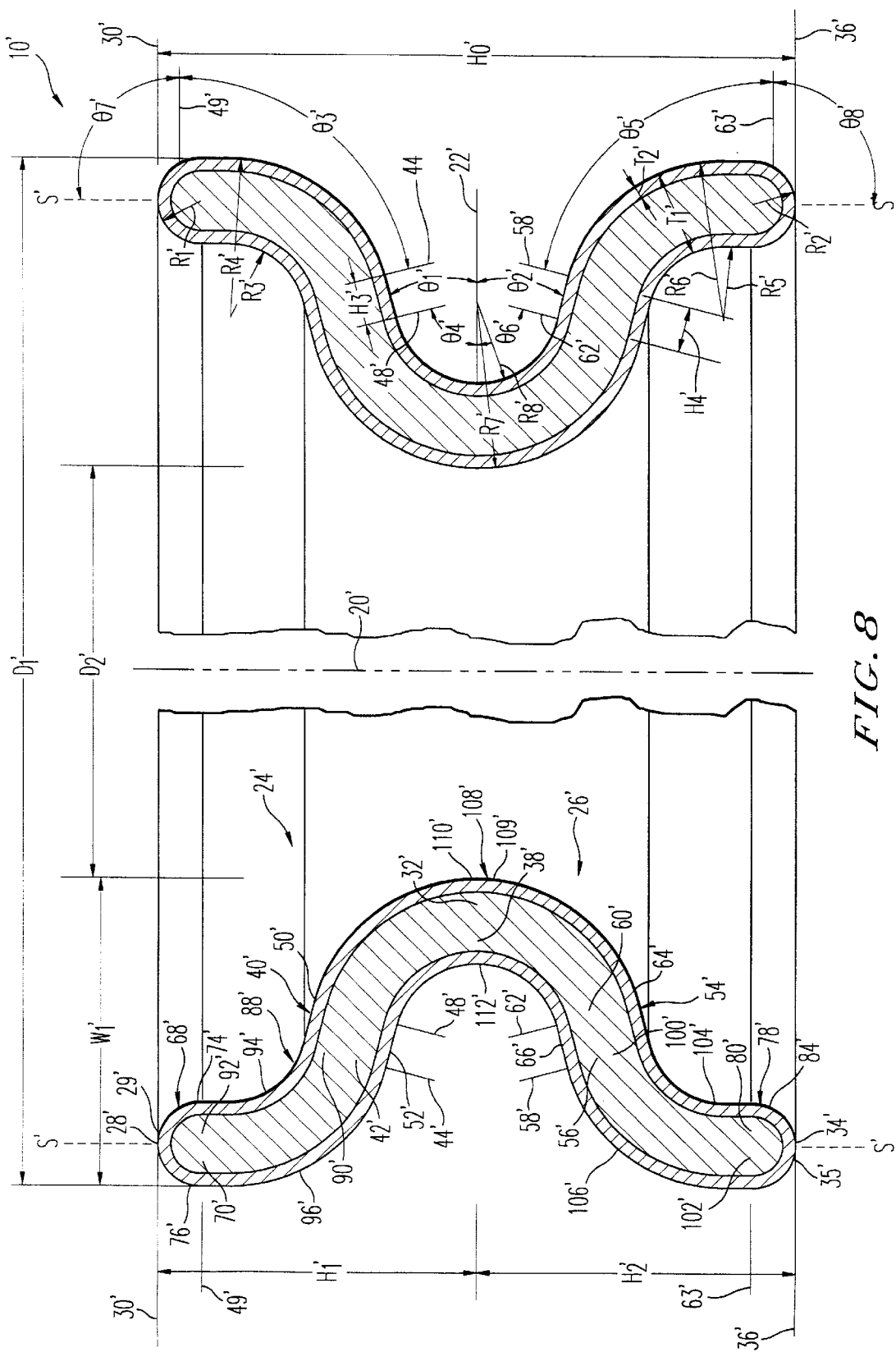
FIG. 8 is an enlarged, partial longitudinal cross-sectional view of the seal or sealing ring illustrated in FIGS. 6 and 7 taken along section line 8—8 in FIG. 7.

As shown in FIGS. 6–8, the seal can be set in an inverted configuration as sealing ring 10'. The reference characters in sealing ring 10' are identified with an apostrophe (') and, unless otherwise stated, are identical or substantially identical to their corresponding reference characters indicated in FIGS. 1–3.

In sealing ring 10', first and second angles $\theta_1'$ and $\theta_2'$, respectively, each are acute angles as illustrated within the range of 0° to 90°. In this event, curved surface 94' of fifth curved portion 88' is a concave curved surface having a radius of curvature $R_3'$ of about 0.020 inch. Curved surface 96' of fifth curved portion 88' is a convex surface having radius of curvature $R_4'$ of about 0.041 inch. Also, curved surface 104' of sixth curved portion 98' is a concave curved surface having a radius of curvature $R_5'$ of about 0.020 inch. Curved surface 106' of sixth curved portion 98' is a convex surface having a radius of curvature $R_6'$ of about 0.041 inch.

Furthermore, curved surface 110' of seventh curved portion 108' is a convex curved surface having a radius of curvature $R_7'$ of about 0.041 inch, and a minimum 109' at a point along or substantially along central plane 22'. Curved surface 112' of seventh curved portion 108' is a concave curved surface having a radius of curvature $R_8'$ of about 0.020 inch. Accordingly, the overall diameter $D_1'$ of the sealing ring 10' is measured as the outer diameters of third portion 68' or fourth portion 78', which are identical or substantially identical to each other. Furthermore, the width $W_1'$ of sealing ring 10' is measured between the surface 76' of third portion (which is in the same or substantially the same plane as surface 86' of fourth portion 78') and the minimum 109' of seventh curved portion 108'. Although measured from different reference surfaces, the dimensions of the overall diameter $D_1'$, inner diameter $D_2'$, and width $W_1'$ of sealing ring 10' are the same as those described above. Furthermore, unless otherwise stated, all other dimensions and angles of sealing ring 10' shown with an apostrophe (') in FIGS. 6–8 are identical to their corresponding dimensions and angles described above with regard to FIGS. 1–3.

Sealing ring 10' in this inverted configuration is shown sealing pipe end 12' to which is attached cap 14' in a manner similar to that discussed above with regard to FIG. 1. However, the high pressure side is outside pipe end 12' and cap 14' due to, for example, a vacuum inside chamber 117' of the pipe. Nevertheless, the first and second sealing surfaces 29' and 35' create sealing darns at sealing lines S' to prevent leakage between first sealing surface 29' and inner surface 120', and between second sealing surface 35' and bottom surface 118' in a manner similar to that described above. Accordingly, the sealing dams create a high integrity seal which has a leak rate of less than $1 \times 10^{-9}$ scc/s He for pressures up to at least 100 psi He, and provides a vacuum or pressure tight connection at $1 \times 10^{-10}$ torr pressure levels.

Third Embodiment

As discussed above, seals 10 and 10' need not be circular in shape, but rather, could be oval, square, polygonal, or any other suitable shape. As shown, for example, in FIG. 9, sealing ring 10A is substantially square in shape. All other dimensions, angles and radii of sealing ring 10A are identical or substantially identical to those discussed above for sealing ring 10 and sealing ring 10'. In view of the similarities between this embodiment and the prior embodiment, this embodiment will not be discussed in detail herein.

Fourth Embodiment

Figure 10:
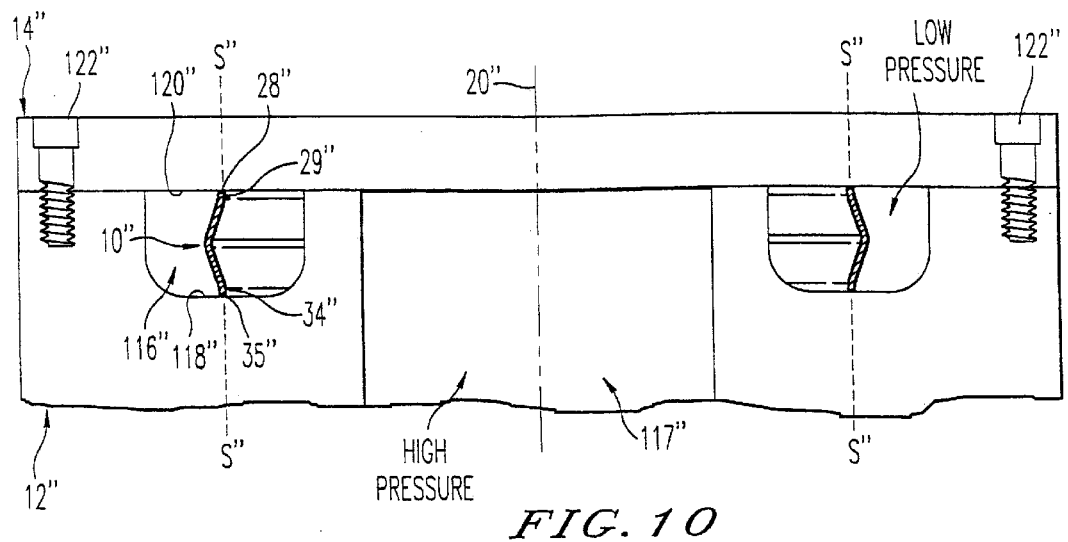
FIG. 10 is a cross-sectional view of a seal or sealing ring in accordance with another embodiment of the present invention, which is shown installed in a groove at the end of a pipe to which is coupled a cap.
Figure 11:
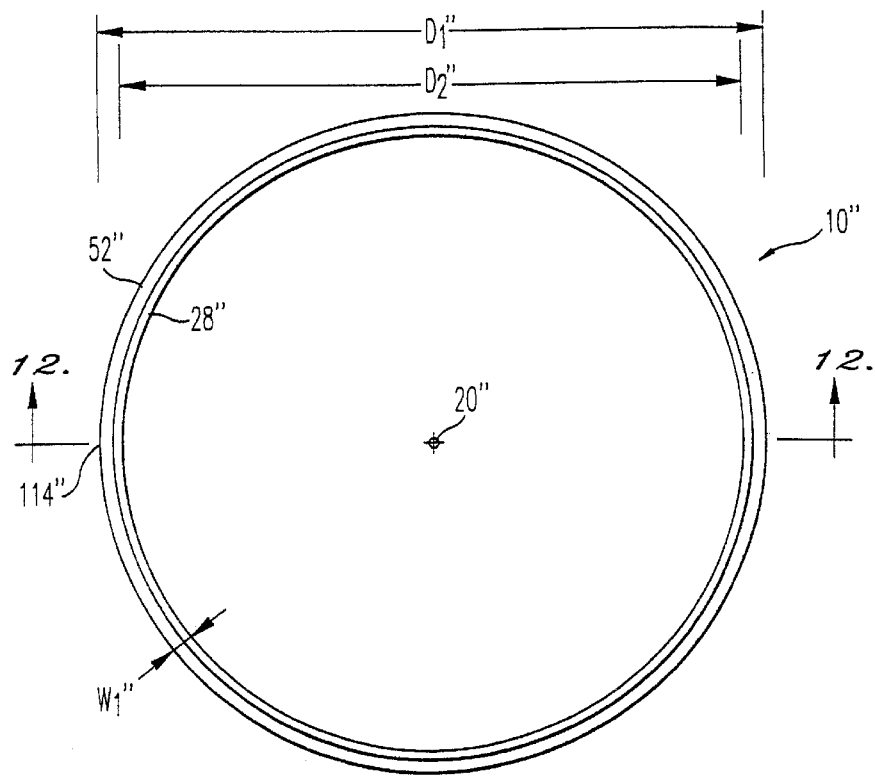
FIG. 11 is a top plan view of the seal or sealing ring as shown in FIG. 10.
Figure 12:
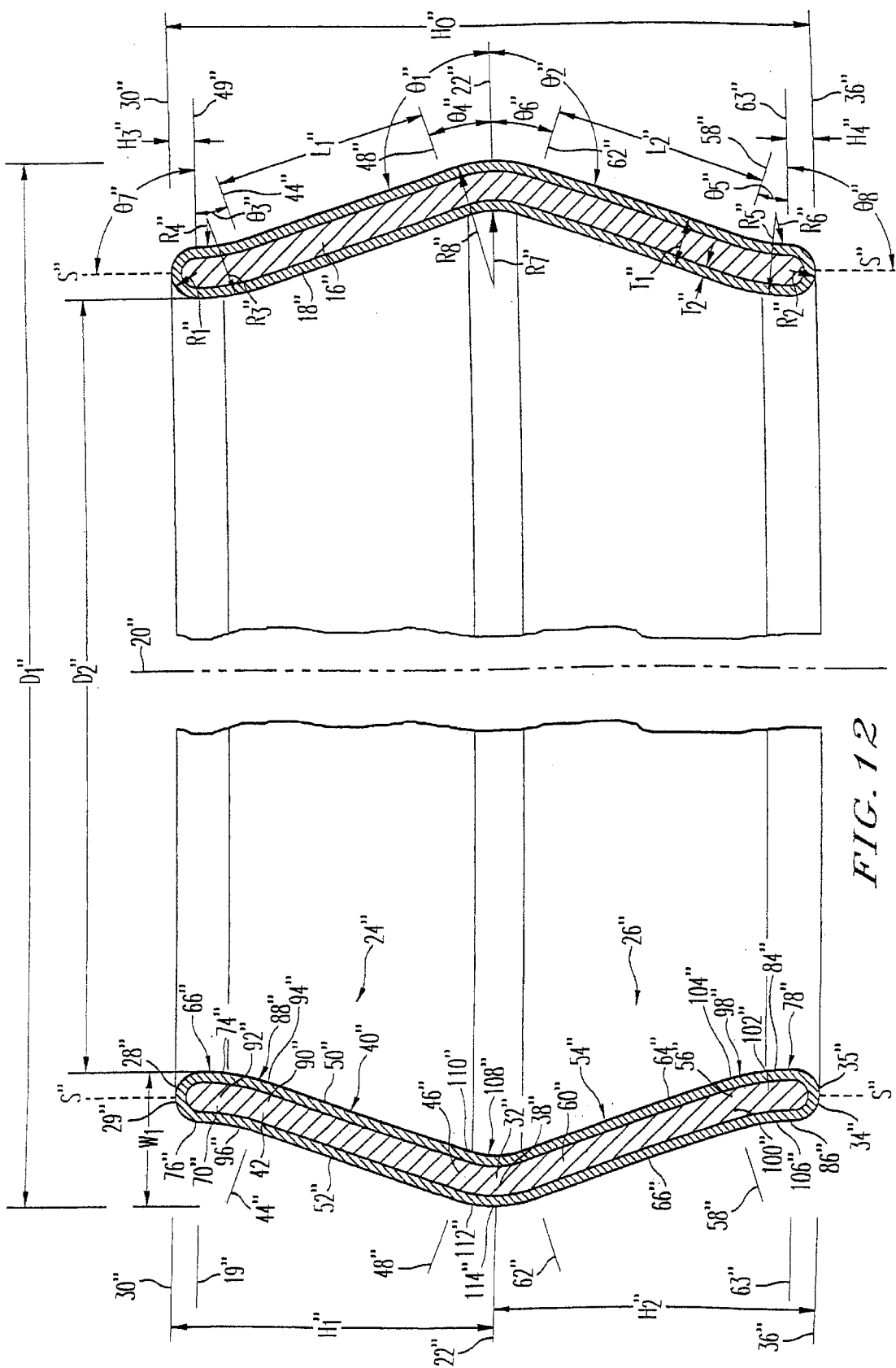
FIG. 12 is an enlarged, partial longitudinal cross-sectional view of the seal or sealing ring illustrated in FIGS. 10 and 11 taken along section line 12—12 in FIG. 11.

As shown in FIGS. 10–12, the angles and radii of curvature of sealing ring 10 can be set so that the seal, which is identified as sealing ring 10", has a substantially V-shaped cross-section. The reference characters in sealing ring 10" are identified with a double apostrophe (") and, unless otherwise stated, are identical or substantially identical to their corresponding reference characters indicated in FIGS. 1–3. In view of the similarities between this embodiment and the prior embodiments, this embodiment will not be discussed in detail herein.

Sealing ring 10" is shown as having the following exemplary angles and dimensions. However, the ranges of dimensions and angles are also identical or substantially identical to their corresponding reference characters indicated in FIGS. 1–3 unless otherwise stated.

In the example of sealing ring 10" shown, first and second angles $\theta_1"$ and $\theta_2"$, respectively, each are obtuse angles of about 115° with respect to central plane 22". Heights $H_1"$ and $H_2"$ are each about 0.109 inch, and overall height $H_0"$ is thus about 0.218 inch. Heights $H_3"$ and $H_4"$ are each about 0.015 inch. $L_1"$ and $L_2"$ are each about 0.074 inch. Diameter $D_1"$ is about 4.007 inches, diameter $D_2"$ is about 3.895 inches, and width $W_1"$ is about 0.056 inch.

Angles $\theta_3"$ and $\theta_5"$ are each about 25° with respect to planes 49" and 63", respectively. Angles $\theta_4"$ and $\theta_6"$ are each about 25° with respect to central plane 22". Curved surface 94" of fifth curved portion 88 is a convex curved surface having a radius of curvature $R_3"$ of about 0.033 inch. Curved surface 96" of fifth curved portion 88" is a concave curved surface having a radius of curvature $R_4"$ of about 0.017 inch. Also, curved surface 104" of sixth curved portion 98" is a convex curved surface having a radius of curvature $R_5"$ of about 0.033 inch. Curved surface 106" of sixth curved portion 98" is a concave curved surface having a radius of curvature $R_6"$ of about 0.017 inch.

Furthermore, curved surface 110" of seventh curved portion 108" is a concave curved surface having a radius of curvature $R_7"$ of about 0.017 inch. Curved surface 112" of seventh curved portion 108" is a convex curved surface having a radius of curvature $R_8"$ of about 0.033 inch, and a maximum 114" at a point along or substantially along central plane 22". Accordingly, the overall diameter $D_1"$ of the sealing ring 10" is measured as the maximum 114". Furthermore, the width $W_1$ of sealing ring 10" is measured between the maximum 114" and surface 74" of third portion (which is in the same or substantially the same plane as surface 84" of fourth portion 78").

Sealing ring 10" in this configuration is shown sealing pipe end 12" to which is attached cap 14" in a manner similar to that discussed above with regard to FIG. 1. The high pressure side is inside pipe end 12" and cap 14". The first and second sealing surfaces 29" and 35" create sealing dams at sealing lines S" to prevent leakage between first sealing surface 29" and inner surface 120", and between second sealing surface 35" and bottom surface 118" in a manner similar to that described above. Accordingly, the sealing dams create a high integrity seal which has a leak rate of less than $1\times10^{-9}$ scc/s He for pressures up to at least 100 psi He, and provides a vacuum or pressure tight connection at $1\times10^{-10}$ torr pressure levels.

Fifth Embodiment

Figure 13:
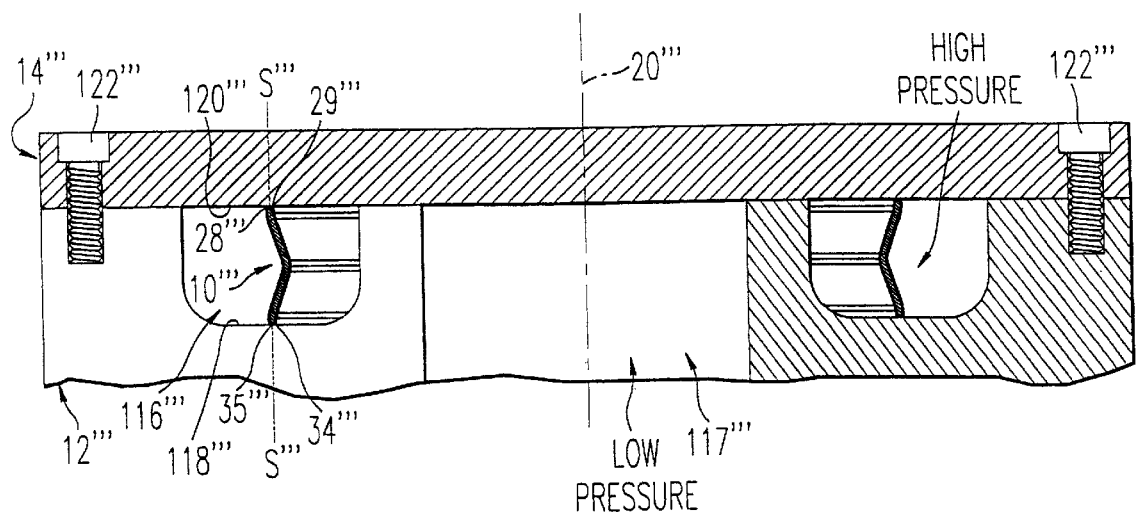
FIG. 13 is a cross-sectional view of the seal or sealing ring shown in FIGS. 10–12, modified in an inverted manner, and shown installed in a groove at the end of a pipe to which is coupled a cap.
Figure 14:
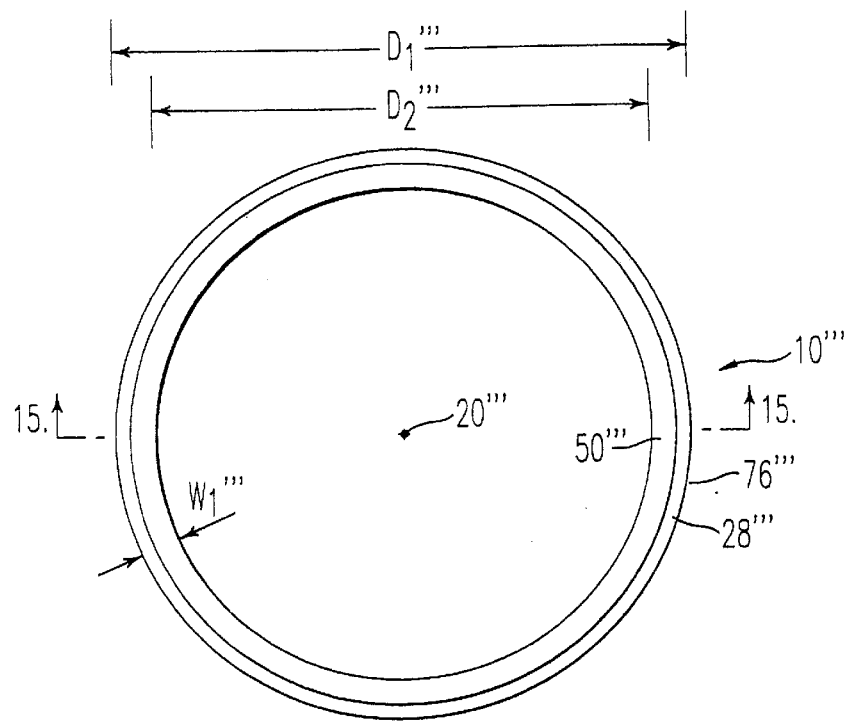
FIG. 14 is a top plan view of the seal or sealing ring as shown in FIG. 13.
Figure 15:
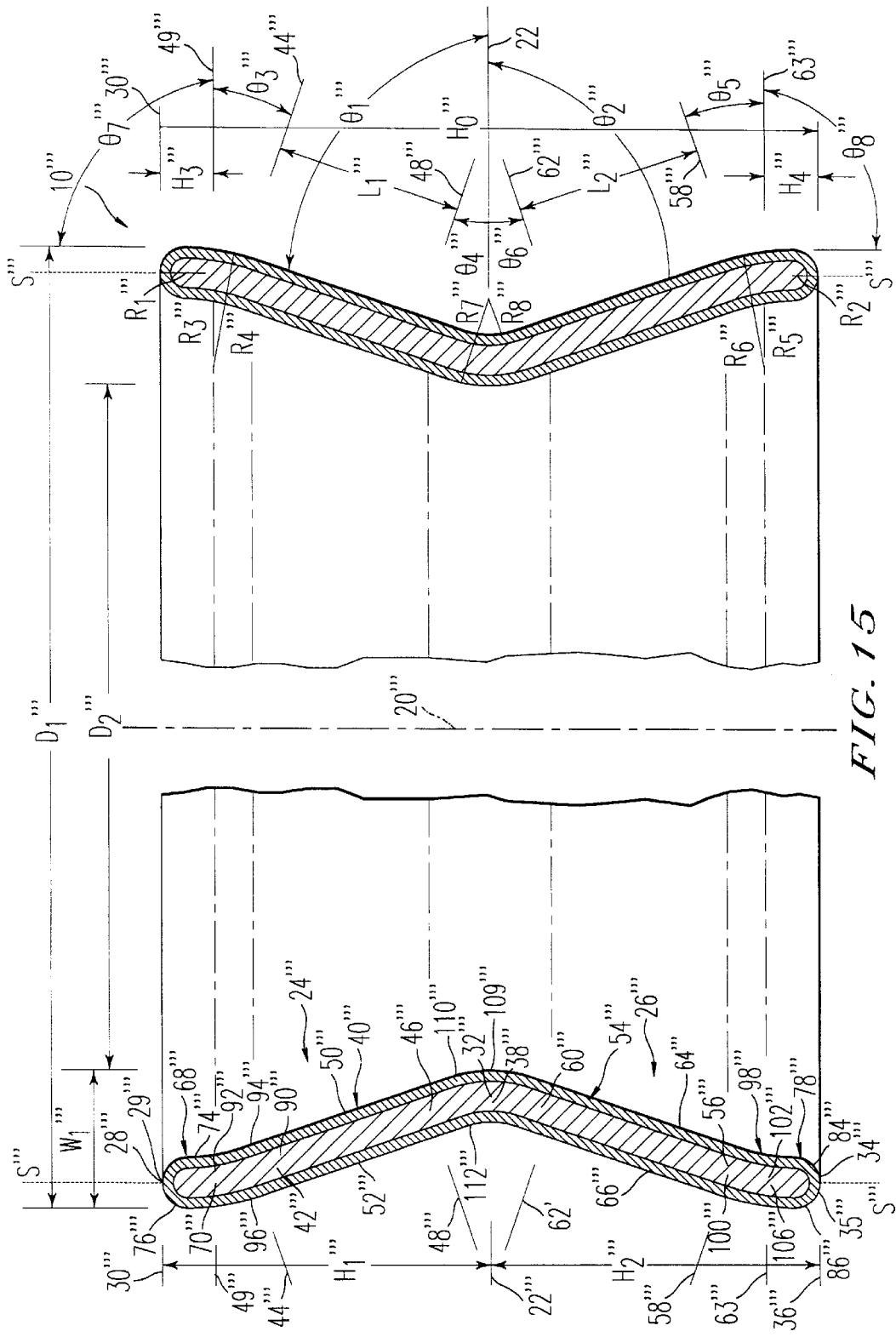
FIG. 15 is an enlarged, partial longitudinal cross-sectional view of the seal or sealing ring illustrated in FIGS. 13 and 14 taken along section line 15—15 in FIG. 14.

As shown in FIGS. 13–15, the angles and radii of curvature of sealing ring 10" can be set so that the seal, which is identified as sealing ring 10''', is inverted in a manner similar to sealing ring 10', and has a substantially V-shaped cross-section. The reference characters in sealing ring 10''' are identified with a triple apostrophe (''') and, unless otherwise stated, are identical or substantially identical to their corresponding reference characters indicated in FIGS. 1–3. In view of the similarities between this embodiment and the prior embodiments, this embodiment will not be discussed in detail herein.

Sealing ring 10''' is shown as having the following exemplary angles and dimensions. However, the ranges of dimensions and angles are also identical or substantially identical to their corresponding reference characters indicated in FIGS. 1–3 unless otherwise stated.

In the example of sealing ring 10''' shown, first and second angles $\theta_1'''$ and $\theta_2'''$, respectively, each are acute angles at about 65° with respect to central plane 22'''. Heights $H_1'''$ and $H_2'''$ are each about 0.109 inch, and overall height $H_0'''$ is thus about 0.218 inch. Heights $H_3'''$ and $H_4'''$ are each about 0.015 inches. $L_1'''$ and $L_2'''$ are each about 0.074 inches. Diameter $D_1'''$ is about 4.007 inches, diameter $D_2'''$ is about 3.895 inches, and width $W_1'''$ is about 0.056 inch.

Angles $\theta_3'''$ and $\theta_5'''$ are each about 25° with respect to planes 49''' and 63''', respectively. Angles $\theta_4'''$ and $\theta_6'''$ are each about 25° with respect to central plane 22'''. Curved surface 94''' of fifth curved portion 88''' is a concave curved surface having a radius of curvature $R_3'''$ of about 0.017 inch. Curved surface 96''' of fifth curved portion 88''' is a convex curved surface having a radius of curvature $R_4'''$ of about 0.033 inch. Also, curved surface 104''' of sixth curved portion 98''' is a concave curved surface having a radius of curvature $R_5'''$ of about 0.017 inch. Curved surface 106''' of sixth curved portion 98''' is a convex curved surface having a radius of curvature $R_6'''$ of about 0.033 inch.

Furthermore, curved surface 110''' of seventh curved portion 108''' is a concave curved surface having a radius of curvature $R_7'''$ of about 0.017 inch, and a minimum 109''' at a point along or substantially along central plane 22'''. Curved surface 112''' of seventh curved portion 108''' is a convex curved surface having a radius of curvature $R_8'''$ of about 0.033 inch. Accordingly, the overall diameter $D_1'''$ of the sealing ring 10''' is measured as the outer diameters of third portion 68''' or fourth portion 78''', which are identical or substantially identical to each other. Furthermore, the width $W_1'''$ of sealing ring 10''' is measured between the surface 76''' of third portion (which is the same or substantially the same plane as surface 86''' of fourth portion 78''') and the minimum 109''' of seventh curved portion 108'''. Although measured from different reference surfaces, the dimensions of the overall diameter $D_1'''$, inner diameter $D_2'''$, and width $W_1'''$ of sealing ring 10''' are the same as those described above.

Sealing ring 10''' in this configuration is shown sealing pipe end 12''' to which is attached cap 14''' in a manner similar to that discussed above with regard to FIG. 10. However, the high pressure side is outside pipe end 12''' and cap 14'''. The first and second sealing surfaces 29''' and 35''' create sealing dams at sealing lines S''' to prevent leakage between first sealing surface 29''' and inner surface 120''' and between second sealing surface 35''' and bottom surface 118''' in a manner similar to that described above. Accordingly, the sealing dams create a high integrity seal which has a leak rate less than $1\times10^{-9}$ scc/s He for pressures up to at least 100 psi He, and provides avacuum or pressure tight connection at $1\times10^{-10}$ torr pressure levels.

Sixth Embodiment

Figure 16:
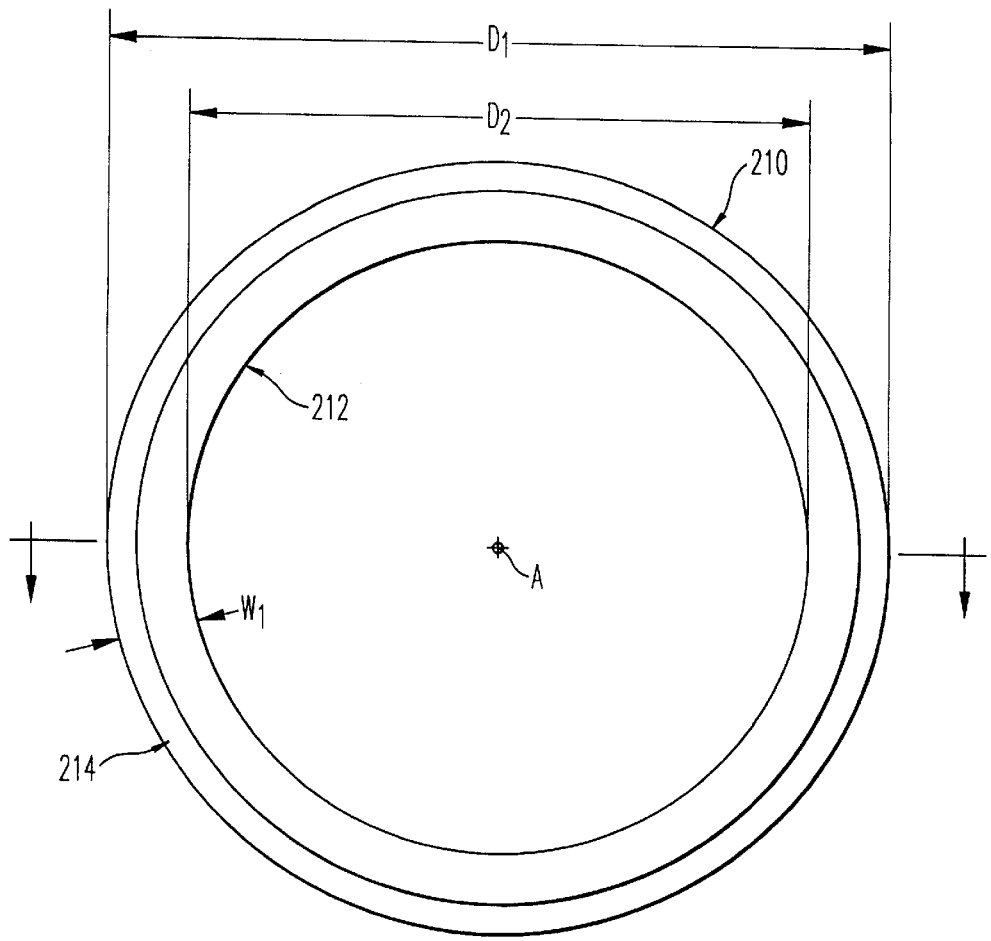
FIG. 16 is a side elevational view of a seal or sealing ring in accordance with a sixth embodiment the present invention.
Figure 17:
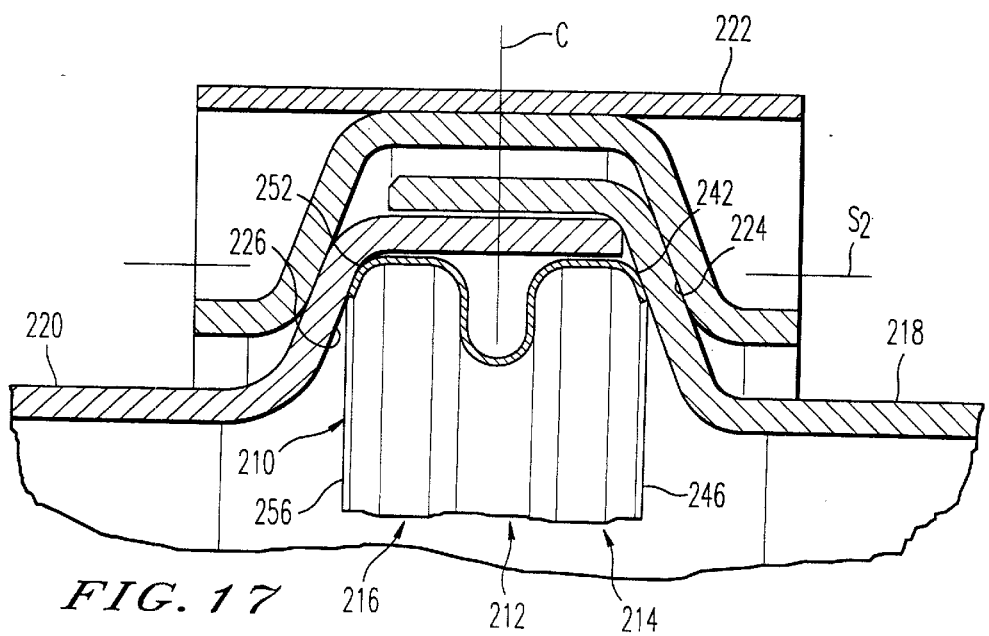
FIG. 17 is an enlarged, partial longitudinal cross-sectional view of the seal or sealing ring illustrated in FIG. 16 installed between the opposing sealing surfaces of a pair of opposing members (flanges of pipes)

Referring now to FIGS. 16–19, a metallic sealing ring 210 in accordance with a sixth embodiment of the present invention is illustrated. Sealing ring 210 basically includes an annular center section 212, a first end section 214 and a second end section 216. Sealing ring 210 is designed to be utilized for creating a seal between opposing surfaces at low load conditions as seen in FIG. 17. Sealing ring 210 of the present invention can be used in a wide variety of applications, especially in pneumatic applications. In pneumatic type applications, the high pressure is normally located on the exterior of the sealing ring 210 illustrated in FIGS. 16–19.

Sealing ring 210 is especially designed to create seal between a pair of angled surfaces (see FIG. 17). Sealing ring 210 is designed to be plastically deformed when an axial load or force is applied thereto. As discussed below, sealing ring 210 can be a single ply with or without a coating layer applied thereto (see FIGS. 30 and 31). Alternatively, sealing ring 210 can have a base layer with a softer layer overlying the base layer (see FIG. 29).

Sealing ring 210 creates a pair of sealing dams spaced from the free edges (annular sealing plane S). As seen in FIG. 17, metallic sealing ring 210 is located between a first member 218 and a second member 220 for creating a seal therebetween. In FIG. 17, members 218 and 220 are pipes with end flanges that are coupled together by a sheet metal clamp 222. Members 218 and 220 have conical sealing surfaces 224 and 226 that are oriented at approximately 40° relative to center plane C of sealing ring 210. Sealing ring 210 contacts opposing surfaces 224 and 226 of members 218 and 220, respectively, to create a pair of annular sealing dams along annular sealing plane S. Clamp 222 applies an axial load along annular sealing plane S to cause deformation of sealing ring 210.

Sealing ring 210 is designed to accommodate various seal cavity tolerances. Sealing ring 210 of the present invention is designed such that deflection of the seal is controlled, i.e., there is no uncontrolled buckling of the end sections 214 and 216 and the end sections 214 and 216 can accommodate a range of deflection with little change in loading. The sealing ring 210 of the present invention is designed to accommodate out of flat and out of parallel cavity conditions. The configuration of the cross-section of sealing ring 210 is further especially designed to accommodate non-circular shapes. By varying the thickness of the base metal of sealing ring 210, the height and the angle of offset, the load can be designed such that the sealing ring 210 will function in a variety of seal gland depths and with various coatings.

Sealing ring 210 can be constructed of a single ply, two plies or a single ply with a coating applied thereto depending on the material of the base ply and the sealing application. Specifically, when sealing ring 210 is utilized in a low load condition, the materials forming sealing ring 210 should be such that the seal deforms to create a seal. For example, sealing ring 210 can include a base ply or material formed of a high strength alloy, such as stainless steel, Inconel 718, or Inconel X-750, with a second ply of a relatively softer material, such as aluminum that overlies the base material (see FIG. 29).

Figure 31:
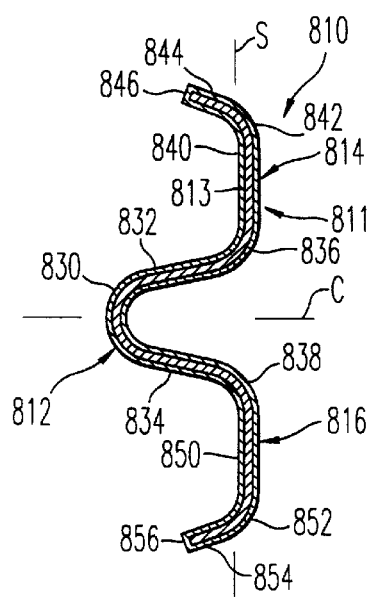
FIG. 31 is a diagrammatic cross-sectional view of a seal or sealing ring in accordance with a thirteenth embodiment of the present invention.

Alternatively, the second ply can be replaced with a soft or smearable coating material (see FIG. 31). The coating can be constructed of relatively soft metals, such as tin, nickel, or the like, or any other suitable material, such as an elastomer or the like. If a metal coating is applied, the coating can be applied by electro-depositing, or the like, or any other suitable metal coating process. The coating generally has a thickness within the range of about 0.001 inch to about 0.006 inch. However, the coating can have any suitable thickness, depending on the application in which the sealing ring 210 is to be used. Furthermore, the thickness of the coating can vary at different locations on the base material. For example, due to an end effect that occurs with an electro-depositing process, the coating thickness can be greater at the distal ends of the base material. However, as can be appreciated from the description below, this increased thickness of the coating can be beneficial in improving seal integrity.

Figure 19:
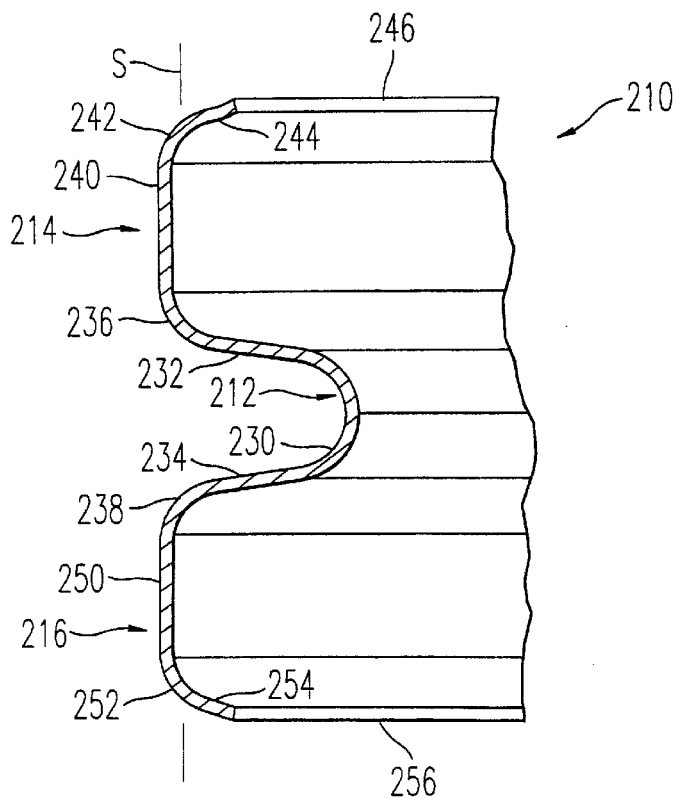
FIG. 19 is an enlarged, partial longitudinal cross-sectional view of the seal or sealing ring illustrated in FIGS. 16–18.

As best seen in FIG. 19, sealing ring 210 has a base layer or material formed of a one-piece, unitary sheet of material that is shaped to form center section 212, first end section 214 and second end section 216. Preferably, this base material has a substantially uniform thickness ranging from about 0.010 inch to about 0.020 inch. Of course, the thickness of the base material of sealing ring 210 can be any suitable thickness depending on the type of material and the application for which the sealing ring 210 is to be used.

While sealing ring 210 is illustrated as a generally circular ring-shaped sealing member, it will be apparent to those skilled in the art from this disclosure that sealing ring 210 does not need to be circularly shaped, as shown. In other words, it will be apparent to those skilled in the art from this disclosure that sealing ring 210 can have other non-circular ring shapes. For example, sealing ring 210 can be a rectangular ring-shaped sealing member (e.g., see FIG. 9). Other shapes for sealing ring 210 include an oval or race-track shape, a square shape, a rectangular shape, a polygon shape, or any other annular shape.

Figure 18:
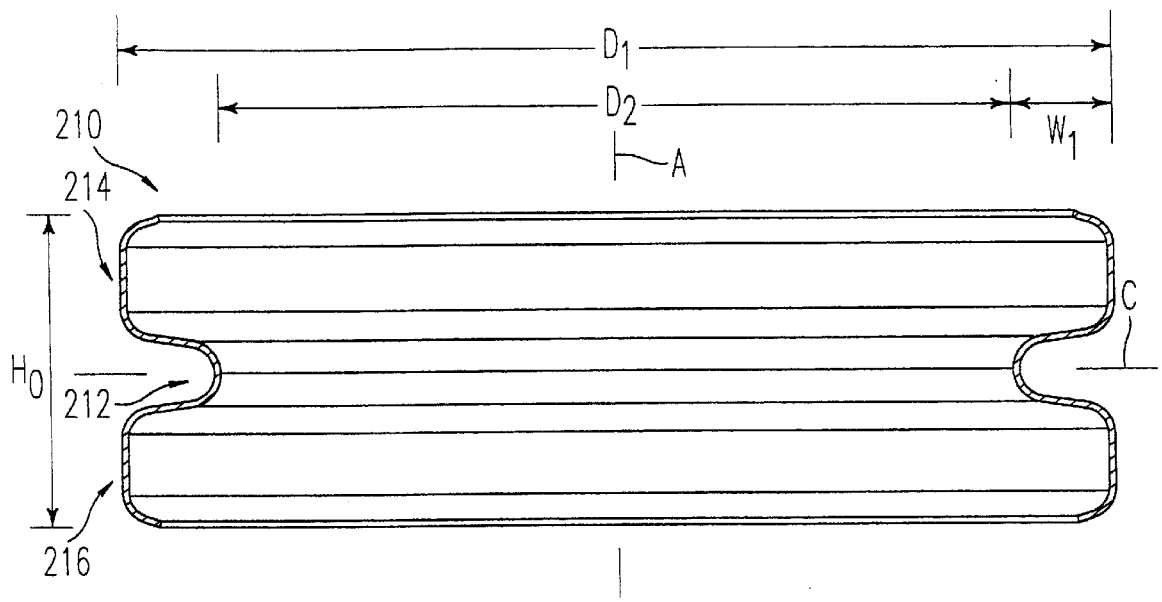
FIG. 18 is a longitudinal cross-sectional view of the seal or sealing ring illustrated in FIGS. 16 and 17 as seen along section line 18—18 of FIG. 16.

In the illustrated embodiment, the sealing ring 210 has an outer diameter $D_1$, an inner diameter $D_2$, a width $W_1$ and an axial height or length $H_0$ which are measured as shown in FIGS. 16 and 18. Preferably, the outer diameter $D_1$ can be within a range of approximately 0.50 inch to approximately 30 inches or more, depending on the type of application. The inner diameter $D_2$ can also be within a range of approximately 0.50 inches to about 30 inches or more, depending on the type of application. The axial height $H_0$ and the width $W_1$ depend upon the diameters $D_1$ and $D_2$ and the type of application. Of course, the diameters $D_2$ and $D_2$, the axial height $H_0$ and the width $W_1$ can have any dimensions suitable to perform the functions of the sealing ring 210 discussed below.

Sealing ring 210 of the present invention can be constructed with the axial height $H_0$ and the width $W_1$ such that the sealing ring can fit into a narrow groove, e.g., dovetail groove or the like. For example, the axial height $H_0$ can be greater than the width $W_1$ (one half of the difference between the outer diameter $D_1$ and the inner diameter $D_2$). In the illustrated example, the axial length $H_0$ is preferably at least twice as great as the width $W_1$. For example, the outer diameter $D_1$ can be approximately 5.50 inches to about 5.512 inches, the inner diameter being approximately 5.124 inches, and the free or unstressed height $H_0$ being approximately 0.512 inch to about 0.532 inch, with the width $W_1$ being dimension such that sealing ring 210 can be easily removed from the groove after deformation thereof. In the illustrated example, the width $W_1$ is about 0.140 inch.

Accordingly, when sealing ring 210 is in a non-compressed state, the overall height $H_0$ of sealing ring 210 can be within a range of 0.100 to 0.600 inch, or more or less depending on the type of application. In accordance with one aspect of the present invention, the aspect ratio of the overall height $H_0$ of sealing ring 210 to the overall width $W_1$ preferably is within the range of about 1.5 to about 5.0. This aspect ratio of the height $H_0$ to the width $W_1$ provides sealing ring 210 with a sufficient rigidity to minimize damage of the sealing ring 210 due to kinking, bending and the like during normal handling, while also creating a seal.

Sealing ring 210 has a pair of annular sealing surfaces that form an annular sealing plane S. Preferably, annular sealing plane S is concentrically mounted about the central longitudinal axis A of sealing ring 210. Annular sealing plane S is formed by the curved sections that are position adjacent the free ends of the first and second end sections 214 and 216 as discussed below. As seen in FIG. 17, the curved sections that are position adjacent the free ends of the first and second end sections 214 and 216 contact the opposing angled surfaces 224 and 226 of the members 218 and 220.

In this embodiment, annular center section 212 has a single convolution. Of course, it will be apparent to those skilled in the art from this disclosure that sealing ring 210 can be formed with two or more convolutions (see FIG. 32). Basically, annular center section 212 has a curved bight portion 230 and a pair of straight portions 232 and 234 that form a substantially U-shaped cross-sectional profile. Annular center section 212 provides sealing ring 210 with a predetermined amount of controlled axial deflection during axial loading of sealing ring 210.

Preferably, annular center section 212 is designed with a relatively large radius of curvature with the straight portions 232 and 234 diverge away from each other as they approach the first and second end sections 214 and 216, respectively. Straight portions 232 and 234 are connected to first end section 214 and second end section 216 by a pair of curved portions 236 and 238. Accordingly, a first end of annular center section 212 is coupled to first end section 214 by curved end portion 236, while a second end of annular center section 212 is coupled to second end section 216 via curved end portion 238. Preferably, center section 212 and first and second end sections 214 and 216 have substantially smooth inner and outer surfaces, i.e., without any sharp bends formed therein. In this embodiment, center section 212 lies on the inside of sealing ring 210 relative to first and second end sections 214 and 216. In other words, the convex surface of center section 212 faces towards the center axis A of sealing ring 210. Of course, it will be apparent to those skilled in the art from this disclosure that center section 212 can extend outwardly from sealing ring 210 relative to first and second end sections 214 and 216 as seen in subsequent embodiments.

Preferably, first and second end sections 214 and 216 are substantially identical, except that first end section 214 is a mirror image of second end section 216. First end section 214 extends substantially axially from center section 212 in a first axial direction. Basically, as viewed in cross-section in FIG. 20, first end section 214 includes a first axially extending leg or straight portion 240, a curved portion 242 and an end portion 244. The free end of first end section 214 forms an edge surface 246. In this embodiment, leg portion 240 is concentrically arranged about the annular sealing plane S. The axial length of leg portion 240 depends on the size of the sealing ring and the space to be sealed between the first and second members 218 and 220. At low load conditions, leg portion 240 will not buckle when a load is applied to sealing ring 210. Rather, in the first end section 214 of sealing ring 210, the load will cause curved portion 242 of first end section 214 to bend during loading of sealing ring 210.

End portion 244 is preferably a conically-shaped annular surface that is deflected towards center section 212 during loading. In the illustrated embodiment, the conically-shaped annular surface of end portion 244 is arranged to form a 20° angle with center plane C of sealing ring 210. In this embodiment, end portion 244 lies on the same side of leg portion 240 as center section 212. In other words, end portion 244 extends towards central axis A relative to leg portion 240.

Second end section 216 extends substantially axially from center section 212 in a second axial direction (opposite of the first axial direction of first end section 214). Basically, as viewed in cross-section in FIG. 19, second end section 216 includes an axially extending leg or straight portion 250, a curved portion 252 and an end portion 254. The free end of second end section 216 forms an edge surface 256. In this embodiment, leg portion 250 is concentrically arranged about the annular sealing plane S. The axial length of leg portion 250 depends on the size of the sealing ring 210 and the space to be sealed between the first and second members 218 and 220. At low load conditions, leg portion 250 will not buckle when a load is applied to sealing ring 210. Rather, in the second end section 216 of sealing ring 210, the load will cause curved portion 252 of second end section 216 to bend during loading of sealing ring 210.

End portion 254 is preferably a conically-shaped annular surface that is deflected towards center section 212 during loading. In the illustrated embodiment, the conically-shaped annular surface of end portion 254 is arranged to form a 20° angle with center plane C of sealing ring 210. In this embodiment, end portion 254 lies on the same side of leg portion 250 as center section 212. In other words, end portion 254 extends towards central axis A relative to leg portion 250.

Referring to FIG. 17, when the seal ring 210 is installed between the first member or pipe 218 and the second member or pipe 220, the conical surfaces 224 and 226 contact the curved portions 242 and 252 (sealing surfaces) of sealing ring 210. The conical surfaces 224 and 226 can be metal or ceramic, for example, or any other suitable material having any suitable surface finish or coarseness. For example, the surfaces 224 and 226 can have any finish within the range of 0 to 70 Ra depending on the coating type and desired sealing performance. Hence, sealing ring 210 can function to seal opposing surfaces which are metal to metal, metal to ceramic, ceramic to ceramic, or any other combination of materials.

The members or pipes 218 and 220 can be secured to by clamp 222. As the members or pipes 218 and 220 are secured together as shown, the surfaces 224 and 226 exert axial forces on the curved portions 242 and 252 (sealing surfaces) of sealing ring 210. These forces compress sealing ring 210, which causes the center section 212 the first and second curved portions 242 and 252 to plastically deform.

In the application illustrated in FIG. 17, a high contact stress plastically deforms the first and second end portions 244 and 254 to create sealing dams between the surface 224 and first sealing surface 242, and between bottom surface 226 and second sealing surface 252, at sealing plane S. As discussed above, if the base material is made of a relatively soft material, such as aluminum, the first and second sealing surfaces 242 and 252 are present on the base material and thus, the base material is plastically deformed at the first and second sealing surfaces 242 and 252 to create the quality sealing dams. However, if as in the example as shown, the base material is a harder material, such as Inconel 718 or Inconel X-750 and is therefore coated with coating, the coating plastically deforms to create the sealing dams at the sealing plane S as indicated above.

Seventh Embodiment

Figure 20:
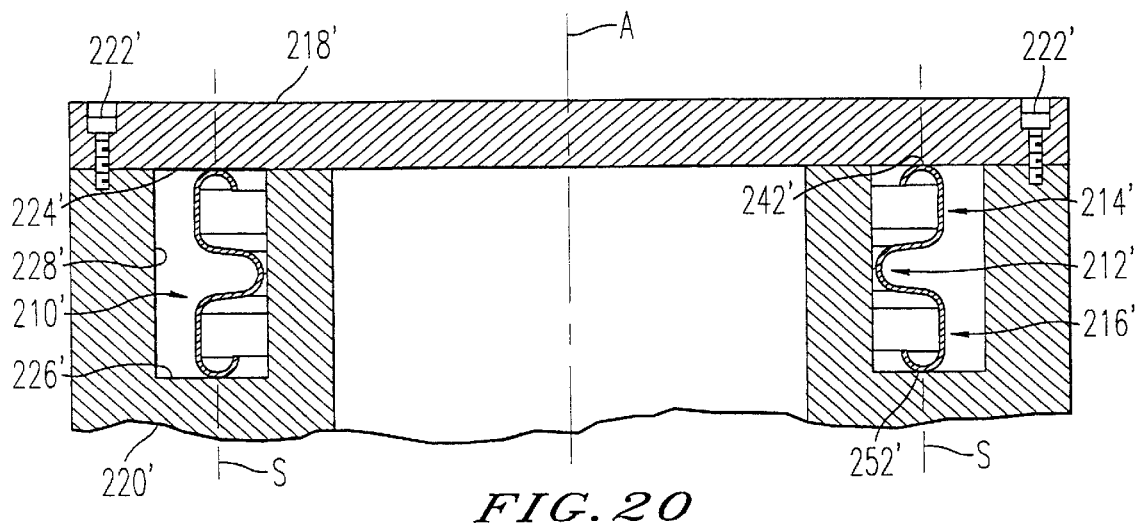
FIG. 20 is an enlarged, partial longitudinal cross-sectional view of a seal or sealing ring in accordance with a seventh embodiment of the present invention, with the sealing ring being installed in a recess formed between the opposing sealing surfaces of a pair of opposing members (a pipe and a cap)
Figure 21:
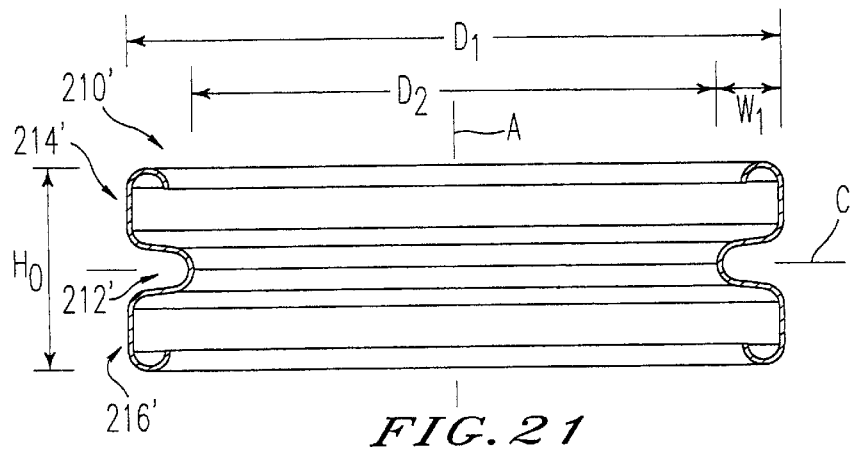
FIG. 21 is a longitudinal cross-sectional view of the seal or sealing ring illustrated in FIG. 20.
Figure 22:
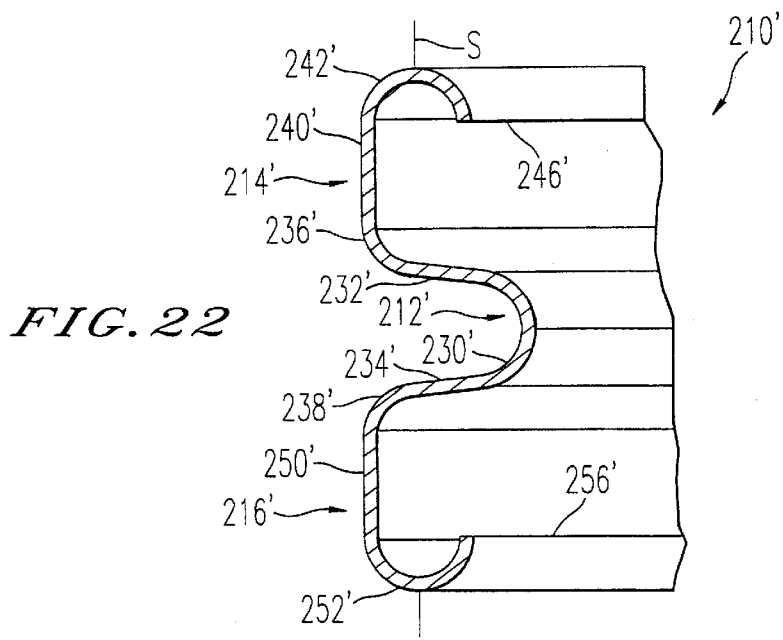
FIG. 22 is an enlarged, partial longitudinal cross-sectional view of the seal or sealing ring illustrated in FIGS. 20 and 21.

Referring now to FIGS. 20–22, a metallic sealing ring 210' in accordance with a seventh embodiment of the present invention is illustrated. Sealing ring 210' basically includes an annular center section 212', a first end section 214' and a second end section 216'. Sealing ring 210' is designed to be utilized for creating seal between opposing surfaces at low load conditions as seen in FIG. 20. Sealing ring 210' of the present invention can be used in a wide variety of applications, especially in pneumatic applications. In pneumatic type applications, the high pressure is normally located on the exterior of the sealing ring 210' illustrated in FIGS. 20–22.

Sealing ring 210' is especially designed to create seal between a pair of parallel surfaces (see FIG. 20). Sealing ring 210' is designed to be plastically deformed when an axial load or force is applied thereto. As discussed below, sealing ring 210' can be a single ply with or without a coating layer applied thereto (see FIGS. 30 and 31). Alternatively, sealing ring 210' can have a base layer with a softer layer overlying the base layer (see FIG. 29).

Sealing ring 210' creates a pair of sealing dams spaced from the free edges (annular sealing plane S). As seen in FIG. 20, metallic sealing ring 210' is located between a first member 218' and a second member 220' for creating a seal therebetween. Sealing ring 210' contacts opposing surfaces 224' and 226' of members 218' and 220', respectively, to create a pair of annular sealing dams along annular sealing plane S. Bolts 222' apply an axial load along annular sealing plane S to cause deformation of sealing ring 210'.

Specifically, first member 218' is a cap that is secured to an end of a pipe or second member 220'. Sealing ring 210' contacts opposing surfaces 224' and 226' of members 218' and 220', respectively, to create a pair of annular sealing dams along annular sealing plane S. First member 218' is coupled to the second member 220' via a plurality of fasteners 222' that apply an axial load or force on sealing ring 210' to cause deformation of sealing ring 210', as discussed below in more detail.

Sealing ring 210' is designed to provide a seal between a pair of opposing members 218' and 220'. Sealing ring 210' is designed to accommodate various seal cavity tolerances. Sealing ring 210' of the present invention is designed such that deflection of the seal is controlled, i.e., there is no uncontrolled buckling of the end sections 214' and 216' and the end sections 214' and 216' can accommodate a range of deflection with little change in loading. The sealing ring 210' of the present invention is designed to accommodate out of flat and out of parallel cavity conditions. The configuration of the cross-section of sealing ring 210' is further especially designed to accommodate non-circular shapes. By varying the thickness of the base metal of sealing ring 210', the height and the angle of offset, the load can be designed such that the sealing ring 210' will function in a variety of seal gland depths and with various coatings.

Sealing ring 210' can be constructed of a single ply, two plies or a single ply with a coating applied thereto depending on the material of the base ply and the sealing application. Specifically, when sealing ring 210' is utilized in a low load condition, the materials forming sealing ring 210' should be such that the seal deforms to create a seal. For example, sealing ring 210' can include a base ply or material formed of a high strength alloy, such as stainless steel, Inconel 718, or Inconel X-750, with a second ply of a relatively softer material, such as aluminum that overlies the base material (see FIG. 29).

Alternatively, the second ply can be replaced with a soft or smearable coating material (see FIG. 31). The coating can be constructed of relatively soft metals, such as tin, nickel, or the like, or any other suitable material, such as an elastomer or the like. If a metal coating is applied, the coating can be applied by electro-depositing, or the like, or any other suitable metal coating process. The coating generally has a thickness within the range of about 0.001 inch to about 0.006 inch. However, the coating can have any suitable thickness, depending on the application in which the sealing ring 210' is to be used. Furthermore, the thickness of the coating can vary at different locations on the base material. For example, due to an end effect that occurs with an electro-depositing process, the coating thickness can be greater at the distal ends of the base material. However, as can be appreciated from the description below, this increased thickness of the coating can be beneficial in improving seal integrity.

As best seen in FIG. 22, sealing ring 210' has a base layer or material formed of a one-piece, unitary sheet of material that is shaped to form center section 212', first end section 214' and second end section 216'. Preferably, this base material has a substantially uniform thickness ranging from about 0.010 inch to about 0.020 inch. Of course, the thickness of the base material of sealing ring 210' can be any suitable thickness depending on the type of material and the application for which the sealing ring 210' is to be used.

While sealing ring 210' is illustrated as a generally circular ring-shaped sealing member, it will be apparent to those skilled in the art from this disclosure that sealing ring 210' does not need to be circularly shaped, as shown. In other words, it will be apparent to those skilled in the art from this disclosure that sealing ring 210' can have other non-circular ring shapes. For example, sealing ring 210' can be a rectangular ring-shaped sealing member (e.g., see FIG. 9). Other shapes for sealing ring 210' include an oval or race-track shape, a square shape, a rectangular shape, a polygon shape, or any other annular shape.

In the illustrated embodiment, the sealing ring 210' has an outer diameter $D_1$, an inner diameter $D_2$, a width $W_1$ and an axial height or length $H_0$ which are measured as shown in FIG. 21. Preferably, the outer diameter $D_1$ can be within a range of approximately 0.50 inch to approximately 30 inches or more, depending on the type of application. The inner diameter $D_2$ can also be within a range of approximately 0.50 inches to about 30 inches or more, depending on the type of application. The axial height $H_0$ and the width $W_1$ depend upon the diameters $D_1$ and $D_2$ and the type of application. Of course, the diameters $D_1$ and $D_2$, the axial height $H_0$ and the width $W_1$ can have any dimensions suitable to perform the functions of the sealing ring 210' discussed below.

Sealing ring 210' of the present invention can be constructed with the axial height $H_0$ and the width $W_1$ such that the sealing ring can fit into a narrow groove, e.g., dovetail groove or the like. For example, the axial height $H_0$ can be greater than the width $W_1$ (one half of the difference between the outer diameter $D_1$ and the inner diameter $D_2$). In the illustrated example, the axial length $H_0$ is preferably at least twice as great as the width $W_1$. For example, the outer diameter $D_1$ can be approximately 5.50 inches to about 5.512 inches, the inner diameter being approximately 5.124 inches, and the free or unstressed height $H_0$ being approximately 0.512 inch to about 0.532 inch, with the width $W_1$ being dimension such that sealing ring 210' can be easily removed from the groove after deformation thereof. In the illustrated example, the width $W_1$ is about 0.140 inch.

Accordingly, when sealing ring 210' is in a non-compressed state, the overall height $H_0$ of sealing ring 210' can be within a range of 0.100 to 0.600 inch, or more or less depending on the type of application. In accordance with one aspect of the present invention, the aspect ratio of the overall height $H_0$ of sealing ring 210' to the overall width $W_1$ preferably is within the range of about 1.5 to about 5.0. This aspect ratio of the height $H_0$ to the width $W_1$ provides sealing ring 210' with a sufficient rigidity to minimize damage of the sealing ring 210' due to kinking, bending and the like during normal handling, while also creating a seal.

Sealing ring 210' has a pair of annular sealing surfaces that form annular sealing plane S. Preferably, the annular sealing plane S is concentrically mounted about the central longitudinal axis A of sealing ring 210'. Annular sealing plane S is formed by the curved sections that are position adjacent the free ends of the first and second end sections 214' and 216' as discussed below. As seen in FIG. 20, the curved sections that are position adjacent the free ends of the first and second end sections 214' and 216' contact the opposing surfaces 224' and 226' of the members 218' and 220'.

In this embodiment, annular center section 212' has a single convolution. Of course, it will be apparent to those skilled in the art from this disclosure that sealing ring 210' can be formed with two or more convolutions (see FIG. 32). Basically, annular center section 212' has a curved bight portion 230' and a pair of straight portions 232' and 234' that form a substantially U-shaped cross-sectional profile. Annular center section 212' provides sealing ring 210' with a predetermined amount of controlled axial deflection during axial loading of sealing ring 210'.

Preferably, annular center section 212' is designed with a relatively large radius of curvature with the straight portions 232' and 234' diverge away from each other as they approach the first and second end sections 214' and 216', respectively. Straight portions 232' and 234' are connected to first end section 214' and second end section 216' by a pair of curved portions 236' and 238'. Accordingly, a first end of annular center section 212' is coupled to first end section 214' by curved end portion 236', while a second end of annular center section 212' is coupled to second end section 216' via curved end portion 238'. Preferably, center section 212' and first and second end sections 214' and 216' have substantially smooth inner and outer surfaces, i.e., without any sharp bends formed therein. In this embodiment, center section 212' lies on the inside of sealing ring 210' relative to first and second end sections 214' and 216'. In other words, the convex surface of center section 212' faces towards the center axis A of sealing ring 210'. Of course, it will be apparent to those skilled in the art from this disclosure that center section 212' can extend outwardly from sealing ring 210' relative to first and second end sections 214' and 216' as seen in subsequent embodiments.

Preferably, first and second end sections 214' and 216' are substantially identical, except that first end section 214' is a mirror image of second end section, 216'. First end section 214' extends substantially axially from center section 212' in a first axial direction. Basically, as viewed in cross-section in FIG. 22, first end section 214' includes a first axially extending leg or straight portion 240', a curved end portion 242'. The free end of first end section 214' forms an edge surface 246'. In this embodiment, leg portion 240' is concentrically arranged about the annular sealing plane S. The axial length of leg portion 240' depends on the size of the sealing ring and the space to be sealed between the first and second members 218' and 220'. At low load conditions, leg portion 240' will not buckle when a load is applied to sealing ring 210'. Rather, in the first end section 214' of sealing ring 210', the load will cause curved portion 242' of first end section 214' to bend during loading of sealing ring 210'.

Second end section 216' extends substantially axially from center section 212' in a second axial direction (opposite of the first axial direction of first end section 214'). Basically, as viewed in cross-section in FIG. 22, second end section 216' includes an axially extending leg or straight portion 250', a curved end portion 252'. The free end of second end section 216' forms an edge surface 256'. In this embodiment, leg portion 250' is concentrically arranged about annular sealing plane S. The axial length of leg portion 250' depends on the size of the sealing ring 210' and the space to be sealed between the first and second members 218' and 220'. At low load conditions, leg portion 250' will not buckle when a load is applied to sealing ring 210'. Rather, in the second end section 216' of sealing ring 210', the load will cause curved portion 252' of second end section 216' to bend during loading of sealing ring 210'.

Referring to FIG. 20, when the sealing ring 210' is installed between the cap or first member 218' and the pipe or second member 220', parallel surfaces 224' and 226' contact the curved sealing surfaces 242' and 252' of sealing ring 210'.

In the illustrated embodiment, pipe or second member 220' includes an annular groove or recess 228' having a depth and width sufficient to accommodate sealing ring 210' as shown, and which surrounds inner chamber of the pipe or second member 220'. Annular groove 228' forms opposing surface 226' which contacts the second curved sealing surface 252' of sealing ring 210' when the sealing ring 210' is placed in groove 228'. The surfaces 224' and 226' can be metal or ceramic, for example, or any other suitable material having any suitable surface finish or coarseness. Hence, sealing ring 210' can function to seal opposing surfaces which are metal to metal, metal to ceramic, ceramic to ceramic, or any other combination of materials.

The cap or first member 218' can be secured to pipe or second member 220', for example, bolts 222', which can pass through openings in the cap 218' and be received into aligning threaded openings in pipe 220' as shown. Other suitable types of fastening members, such as rivets, clamps, and the like, can also be used to secure cap 218' to pipe 220'. Furthermore, cap 218' can be held to pipe end 220' by a vacuum or negative pressure created in the inner chamber of pipe 220'. Alternatively, the cap 218' and the end of pipe 220' can include mating threads (not shown) which enable the cap 218' to be screwed onto the pipe 220'.

As the cap 218' is secured to the pipe end 220' as shown, the bottom surface 226' exerts a force on second curved sealing surface 252', while inner surface 224' of cap 218' exerts a force on first curved sealing surface 242'. These forces compress sealing ring 210', which causes the center section 212' the first and second end portions 244' and 254' to plastically deform.

Since the first and second curved sealing surfaces 242' and 252' are located to form axial ends of the first and second end sections 214' and 216', respectively, the forces or load imposed on sealing ring 210' are concentrated in narrow bands about the sealing ring 210' on each of the first and second curved sealing surfaces 242' and 252'. The narrow band on each of the first and second sealing surfaces 242' and 252' has a very small width, usually within a range of about 0.010 inch to about 0.040 inch, and thus has a very small surface area, which creates high contact stress between the first and second sealing surfaces 242' and 252' and the inner surface 224' and bottom surface 226', respectively.

In the application illustrated in FIG. 20, a high contact stress plastically deforms the first and second end portions 244' and 254' to create high quality sealing dams between the surface 224' and first sealing surface 242', and between bottom surface 226' and second sealing surface 252', at sealing plane S. As discussed above, if the base material is made of a relatively soft material, such as aluminum, the first and second sealing surfaces 242' and 252' are present on the base material and thus, the base material is plastically deformed at the first and second sealing surfaces 242' and 252' to create the sealing dams. However, if as in the example as shown, the base material is a harder material, such as Inconel 718 or Inconel X-750 and is therefore coated with coating, the coating plastically deforms to create the sealing dams at the sealing plane S as indicated above.

Eighth Embodiment

Figure 23:
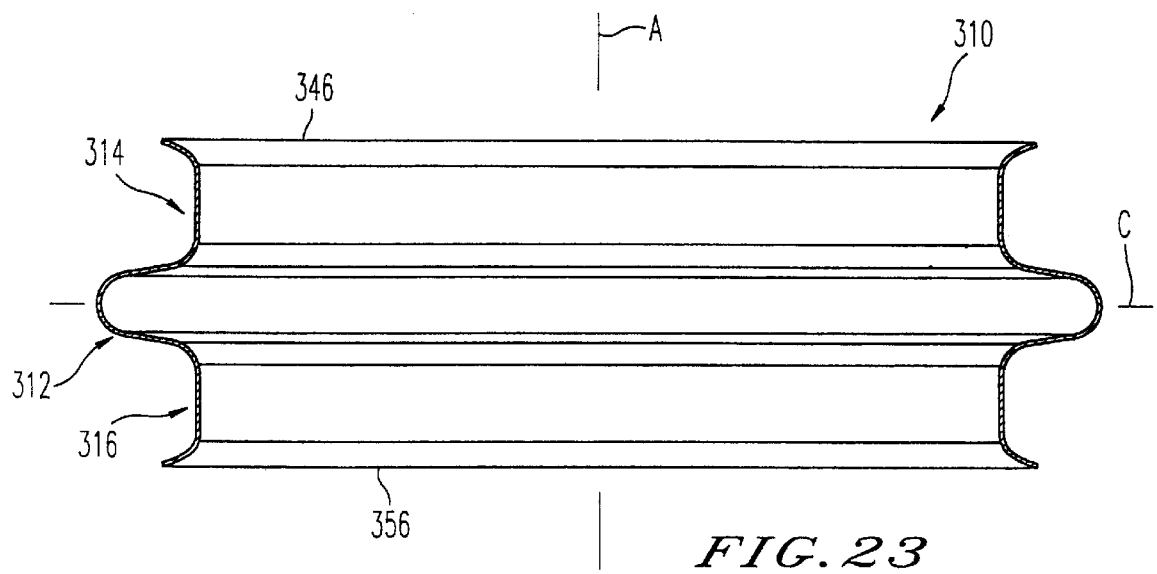
FIG. 23 is a longitudinal cross-sectional view of a seal or sealing ring in accordance with an eighth embodiment of the present invention.
Figure 24:
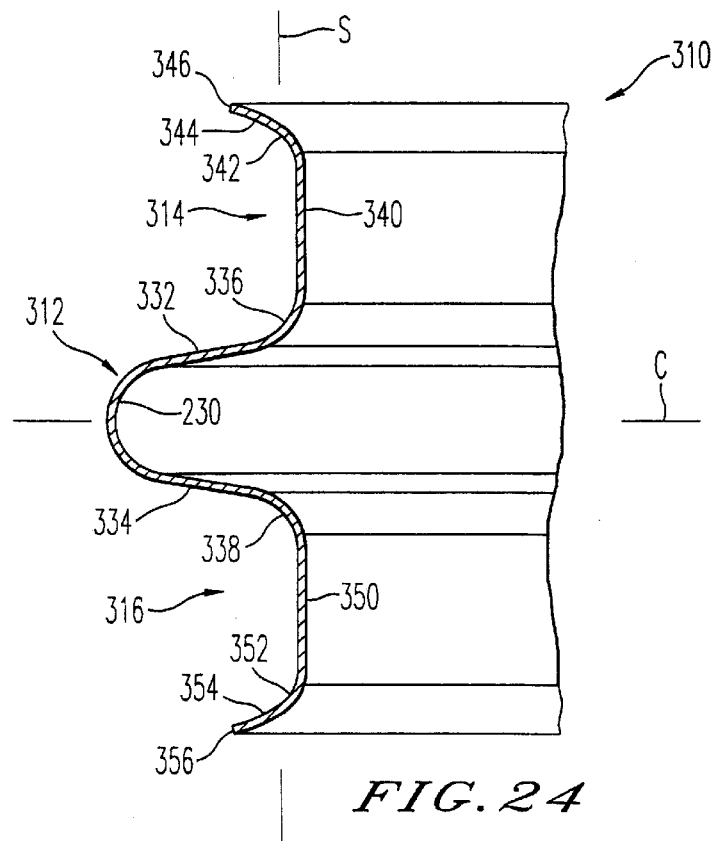
FIG. 24 is an enlarged, partial longitudinal cross-sectional view of the seal or sealing ring illustrated in FIG. 23 in accordance with the eighth embodiment of the present invention.

Referring now to FIGS. 23 and 24, a modified metallic sealing ring 310 in accordance with an eighth embodiment of the present invention is illustrated. In this embodiment, sealing ring 310 has substantially the same cross-sectional profile as sealing ring 210, discussed above, except that the cross-sectional profile has been inverted. Of course, the ends of sealing ring 310 can be modified to have curved ends that are the same as shown in the sealing ring 210'. In view of the similarities between this embodiment and the prior embodiment, this embodiment will not be discussed in detail herein. In other words, the various materials, the dimensions, the applications, and other features of this embodiment are identical or substantially identical to the prior and subsequent sealing rings of the present invention unless otherwise stated.

As best seen in FIG. 24, sealing ring 310 has a base layer or material formed of a one-piece, unitary sheet of material that is shaped to form center section 312, first end section 314 and second end section 316. While sealing ring 310 is illustrated as a generally circular ring-shaped sealing member, it will be apparent to those skilled in the art from this disclosure that sealing ring 310 does not need to be circularly shaped, as shown. In other words, it will be apparent to those skilled in the art from this disclosure that sealing ring 310 can have other non-circular ring shapes. For example, sealing ring 310 can be a rectangular ring-shaped sealing member (e.g., see FIG. 9). Other shapes for sealing ring 310 include an oval or race-track shape, a square shape, a rectangular shape, a polygon shape, or any other annular shape.

Sealing ring 310 has a pair of annular sealing surfaces that form an annular sealing plane S. Preferably, annular sealing plane S is concentrically mounted about the central longitudinal axis A of sealing ring 310. Annular sealing plane S is formed by the curved sections that are position adjacent the free ends of the first and second end sections 314 and 316 as discussed below. In other words, sealing ring 310 can be used to create seal between either a pair of angled surfaces (see FIG. 17) or a pair of parallel surfaces (see FIG. 20) if the ends are modified to be curved ends as in sealing ring 210', discussed above.

In this embodiment, annular center section 312 has a single convolution. Of course, it will be apparent to those skilled in the art from this disclosure that sealing ring 310 can be formed with two or more convolutions (see FIG. 32). Basically, annular center section 312 has a curved bight portion 330 and a pair of straight portions 332 and 334 that form a substantially U-shaped cross-sectional profile. Annular center section 312 provides sealing ring 310 with a predetermined amount of controlled axial deflection during axial loading of sealing ring 310.

Preferably, annular center section 312 is designed with a relatively large radius of curvature with the straight portions 332 and 334 diverge away from each other as they approach the first and second end sections 314 and 316, respectively. Straight portions 332 and 334 are connected to first end section 314 and second end section 316 by a pair of curved portions 336 and 338. Accordingly, a first end of annular center section 312 is coupled to first end section 314 by curved end portion 336, while a second end of annular center section 312 is coupled to second end section 316 via curved end portion 338. Preferably, center section 312 and first and second end sections 314 and 316 have substantially smooth inner and outer surfaces, i.e., without any sharp bends formed therein. In this embodiment, center section 312 lies on the outside of sealing ring 310 relative to first and second end sections 314 and 316. In other words, the convex surface of center section 312 faces away from the center axis A of sealing ring 310.

Preferably, first and second end sections 314 and 316 are substantially identical, except that first end section 314 is a mirror image of second end section 316. First end section 314 extends substantially axially from center section 312 in a first axial direction. Basically, as viewed in cross-section in FIG. 24, first end section 314 includes a first axially extending leg or straight portion 340, a curved portion 342 and an end portion 344. The free end of first end section 314 forms an edge surface 346. In this embodiment, leg portion 340 is concentrically arranged about annular sealing plane S. The axial length of leg portion 340 depends on the size of the sealing ring and the space to be sealed between the first and second members 318 and 320. At low load conditions, leg portion 340 will not buckle when a load is applied to sealing ring 310. Rather, in the first end section 314 of sealing ring 310, the load will cause curved portion 342 of first end section 314 to bend during loading of sealing ring 310.

End portion 344 is preferably a conically-shaped annular surface that is deflected towards center section 312 during loading. In the illustrated embodiment, the conically-shaped annular surface of end portion 344 is arranged to form a 20° angle with center plane C of sealing ring 310. In this embodiment, end portion 344 lies on the same side of leg portion 340 as center section 312. In other words, end portion 344 extends away from central axis A relative to leg portion 340.

Second end section 316 extends substantially axially from center section 312 in a second axial direction (opposite of the first axial direction of first end section 314). Basically, as viewed in cross-section in FIG. 24, second end section 316 includes an axially extending leg or straight portion 350, a curved portion 352 and an end portion 354. The free end of second end section 316 forms an edge surface 356. In this embodiment, leg portion 350 is concentrically arranged about annular sealing plane S. The axial length of leg portion 350 depends on the size of the sealing ring 310 and the space to be sealed between the first and second members 318 and 320. At low load conditions, leg portion 350 will not buckle when a load is applied to sealing ring 310. Rather, in the second end section 316 of sealing ring 310, the load will cause curved portion 352 of second end section 316 to bend during loading of sealing ring 310.

End portion 354 is preferably a conically-shaped annular surface that is deflected towards center section 312 during loading. In the illustrated embodiment, the conically-shaped annular surface of end portion 354 is arranged to form a 20° angle with center plane C of sealing ring 310. In this embodiment, end portion 354 lies on the same side of leg portion 350 as center section 312. In other words, end portion 354 extends away from central axis A relative to leg portion 350.

Sealing ring 310 is designed to accommodate various seal cavity tolerances. Sealing ring 310 of the present invention is designed such that deflection of the seal is controlled, i.e., there is no uncontrolled buckling of the end sections 314 and 316 and the end sections 314 and 316 can accommodate a range of deflection with little change in loading.

Sealing ring 310 can be constructed of a single ply, two plies or a single ply with a coating applied thereto depending on the material of the base ply and the sealing application. Specifically, when sealing ring 310 is utilized in a low load condition, the materials forming sealing ring 310 should be such that the seal deforms to create a seal. For example, sealing ring 310 can include a base ply or material formed of a high strength alloy, such as stainless steel, Inconel 718, or Inconel X-750, with a second ply of a relatively softer material, such as aluminum that overlies the base material (see FIG. 29).

Alternatively, the second ply can be replaced with a soft or smearable coating material (see FIG. 31). The coating can be constructed of relatively soft metals, such as tin, nickel, or the like, or any other suitable material, such as an elastomer or the like. If a metal coating is applied, the coating can be applied by electro-depositing, or the like, or any other suitable metal coating process as mentioned in prior embodiments.

Ninth Embodiment

Figure 25:
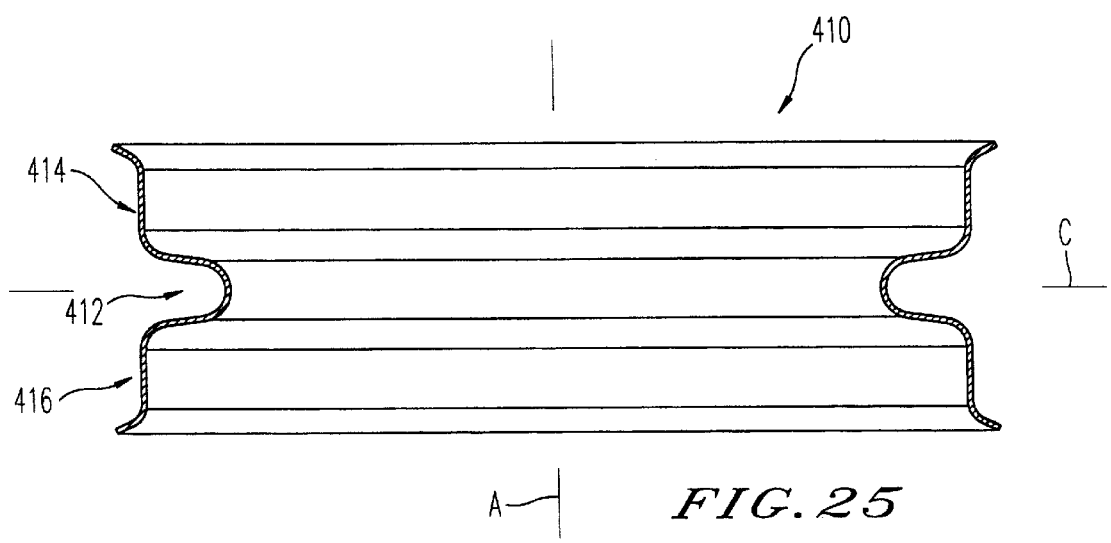
FIG. 25 is a longitudinal cross-sectional view of a seal or sealing ring in accordance with a ninth embodiment of the present invention.
Figure 26:
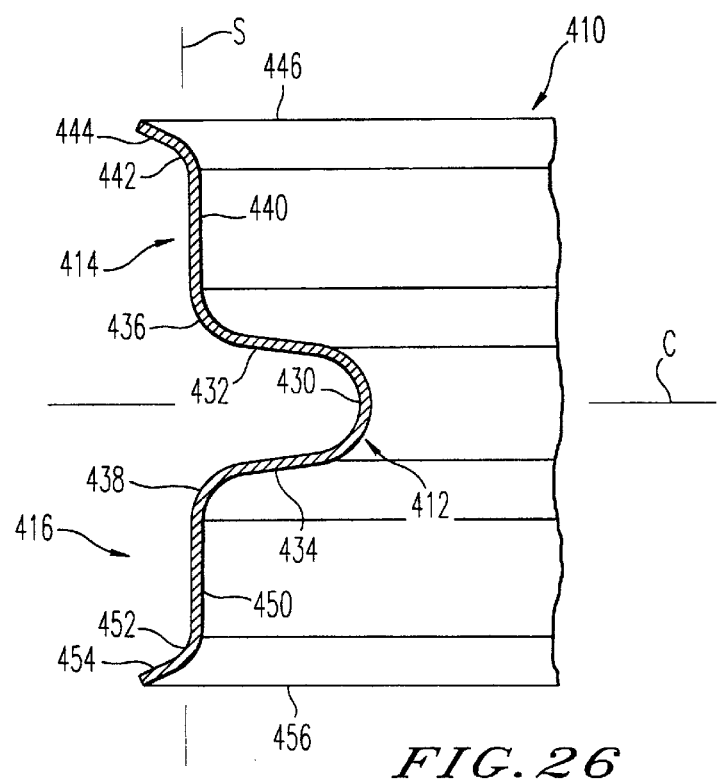
FIG. 26 is an enlarged, partial longitudinal cross-sectional view of the seal or sealing ring illustrated in FIG. 25 in accordance with the ninth embodiment of the present invention.

Referring now to FIGS. 25 and 26, a metallic sealing ring 410 in accordance with a ninth embodiment of the present invention is illustrated. Sealing ring 410 is substantially identical to sealing ring 210, discussed above, except that the free ends of sealing ring 410 has been inverted as compared to the free ends of sealing ring 210. Of course, the ends of sealing ring 410 can be modified to have curved ends that are the same as shown in the sealing ring 210'. In view of the similarities between sealing rings 210 and 410, sealing ring 410 will not be discussed or illustrated in detail herein. In other words, the various materials, the dimensions, the applications, and other features of this embodiment are identical or substantially identical to the prior and subsequent sealing rings of the present invention unless otherwise stated.

As best seen in FIG. 25, sealing ring 410 has a base layer or material formed of a one-piece, unitary sheet of material that is shaped to form center section 412, first end section 414 and second end section 416. While sealing ring 410 is illustrated as a generally circular ring-shaped sealing member, it will be apparent to those skilled in the art from this disclosure that sealing ring 410 does not need to be circularly shaped, as shown. In other words, it will be apparent to those skilled in the art from this disclosure that sealing ring 410 can have other non-circular ring shapes. For example, sealing ring 410 can be a rectangular ring-shaped sealing member (e.g., see FIG. 9). Other shapes for sealing ring 410 include an oval or race-track shape, a square shape, a rectangular shape, a polygon shape, or any other annular shape.

Sealing ring 410 has a pair of annular sealing surfaces that form an annular sealing plane S. Preferably, annular sealing plane S is concentrically mounted about the central longitudinal axis A of sealing ring 410. Annular sealing plane S is formed by the curved sections that are position adjacent the free ends of the first and second end sections 414 and 416 as discussed below. In other words, sealing ring 410 can be used to create seal between either a pair of angled surfaces (see FIG. 17) or a pair of parallel surfaces (see FIG. 20) if the ends are modified to be curved ends as in sealing ring 210' discussed above.

In this embodiment, annular center section 412 has a single convolution. Of course, it will be apparent to those skilled in the art from this disclosure that sealing ring 410 can be formed with two or more convolutions (see FIG. 32). Basically, annular center section 412 has a curved bight portion 430 and a pair of straight portions 432 and 434 that form a substantially U-shaped cross-sectional profile. Annular center section 412 provides sealing ring 410 with a predetermined amount of controlled axial deflection during axial loading of sealing ring 410.

Preferably, annular center section 412 is designed with a relatively large radius of curvature with the straight portions 432 and 434 diverge away from each other as they approach the first and second end sections 414 and 416, respectively. Straight portions 432 and 434 are connected to first end section 414 and second end section 416 by a pair of curved portions 436 and 438. Accordingly, a first end of annular center section 412 is coupled to first end section 414 by curved end portion 436, while a second end of annular center section 412 is coupled to second end section 416 via curved end portion 438. Preferably, center section 412 and first and second end sections 414 and 416 have substantially smooth inner and outer surfaces, i.e., without any sharp bends formed therein. In this embodiment, center section 412 lies on the inside of sealing ring 410 relative to first and second end sections 414 and 416. In other words, the convex surface of center section 412 faces towards the center axis A of sealing ring 410.

Preferably, first and second end sections 414 and 416 are substantially identical, except that first end section 414 is a mirror image of second end section 416. First end section 414 extends substantially axially from center section 412 in a first axial direction. Basically, as viewed in cross-section in FIG. 26, first end section 414 includes a first axially extending leg or straight portion 440, a curved portion 442 and an end portion 444. The free end of first end section 414 forms an edge surface 446. In this embodiment, leg portion 440 is concentrically arranged about annular sealing plane S. The axial length of leg portion 440 depends on the size of the sealing ring and the space to be sealed between the first and second members 418 and 420. At low load conditions, leg portion 440 will not buckle when a load is applied to sealing ring 410. Rather, in the first end section 414 of sealing ring 410, the load will cause curved portion 442 of first end section 414 to bend during loading of sealing ring 410.

End portion 444 is preferably a conically-shaped annular surface that is deflected towards center section 412 during loading. In the illustrated embodiment, the conically-shaped annular surface of end portion 444 is arranged to form a 20° angle with center plane C of sealing ring 410. In this embodiment, end portion 444 lies on the same side of leg portion 440 as center section 412. In other words, end portion 444 extends away from central axis A relative to leg portion 440.

Second end section 416 extends substantially axially from center section 412 in a second axial direction (opposite of the first axial direction of first end section 414). Basically, as viewed in cross-section in FIG. 26, second end section 416 includes an axially extending leg or straight portion 450, a curved portion 452 and an end portion 454. The free end of second end section 416 forms an edge surface 456. In this embodiment, leg portion 450 is concentrically arranged about annular sealing plane S. The axial length of leg portion 450 depends on the size of the sealing ring 410 and the space to be sealed between the first and second members 418 and 420. At low load conditions, leg portion 450 will not buckle when a load is applied to sealing ring 410. Rather, in the second end section 416 of sealing ring 410, the load will cause curved portion 452 of second end section 416 to bend during loading of sealing ring 410.

End portion 454 is preferably a conically-shaped annular surface that is deflected towards center section 412 during loading. In the illustrated embodiment, the conically-shaped annular surface of end portion 454 is arranged to form a 20° angle with center plane C of sealing ring 410. In this embodiment, end portion 454 lies on the same side of leg portion 450 as center section 412. In other words, end portion 454 extends away from central axis A relative to leg portion 450.

Sealing ring 410 is designed to accommodate various seal cavity tolerances. Sealing ring 410 of the present invention is designed such that deflection of the seal is controlled, i.e., there is no uncontrolled buckling of the end sections 414 and 416 and the end sections 414 and 416 can accommodate a range of deflection with little change in loading.

Sealing ring 410 can be constructed of a single ply, two plies or a single ply with a coating applied thereto depending on the material of the base ply and the sealing application. Specifically, when sealing ring 410 is utilized in a low load condition, the materials forming sealing ring 410 should be such that the seal deforms to create a seal. For example, sealing ring 410 can include a base ply or material formed of a high strength alloy, such as stainless steel, Inconel 718, or Inconel X-750, with a second ply of a relatively softer material, such as aluminum that overlies the base material (see FIG. 29).

Alternatively, the second ply can be replaced with a soft or smearable coating material (see FIG. 31). The coating can be constructed of relatively soft metals, such as tin, nickel, or the like, or any other suitable material, such as an elastomer or the like. If a metal coating is applied, the coating can be applied by electro-depositing, or the like, or any other suitable metal coating process.

Tenth Embodiment

Figure 27:
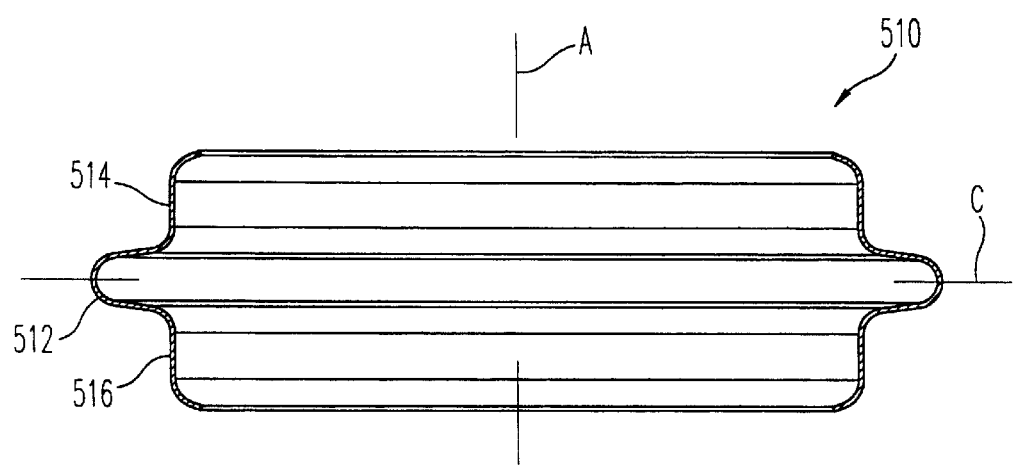
FIG. 27 is a longitudinal cross-sectional view of a seal or sealing ring in accordance with a tenth embodiment of the present invention.
Figure 28:
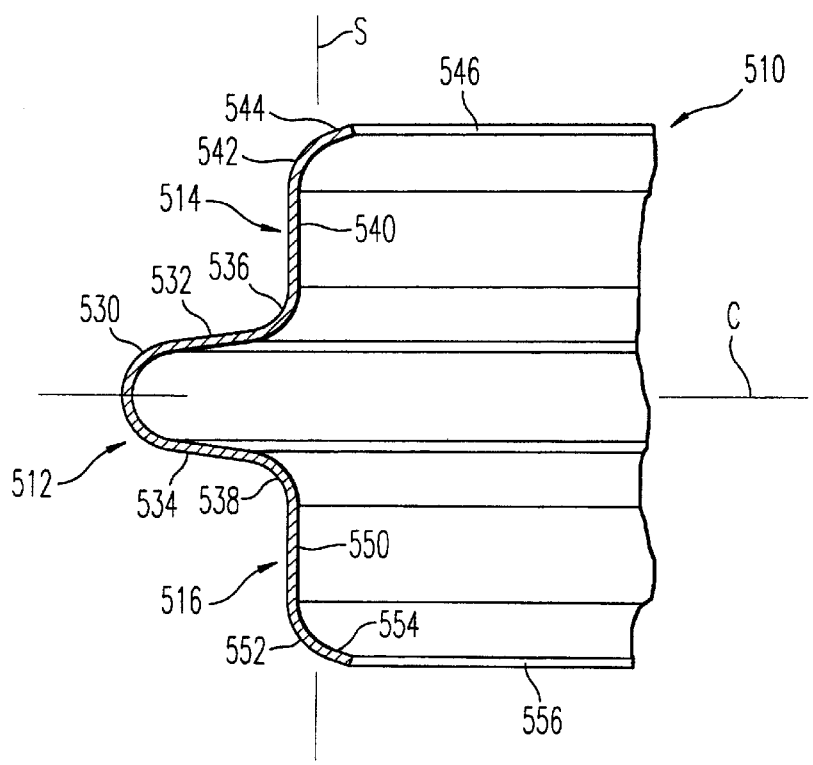
FIG. 28 is an enlarged, partial longitudinal cross-sectional view of the seal or sealing ring illustrated in FIG. 27 in accordance with the tenth embodiment of the present invention.

Referring now to FIGS. 27 and 28, a metallic sealing ring 510 in accordance with a tenth embodiment of the present invention is illustrated. Sealing ring 510 is substantially identical to the sealing ring 210, discussed, above, except that the cross-sectional profile has been inverted. Of course, the ends of sealing ring 510 can be modified to have curved ends that are the same as shown in the sealing ring 210'. In view of the similarities between sealing rings 210 and 510, sealing ring 510 will not be discussed or illustrated in detail herein. In other words, the various materials, the dimensions, the applications, and other features of this embodiment are identical or substantially identical to the prior and subsequent sealing rings of the present invention unless otherwise stated.

As best seen in FIG. 27, sealing ring 510 has a base layer or material formed of a one-piece, unitary sheet of material that is shaped to form center section 512, first end section 514 and second end section 516. While sealing ring 510 is illustrated as a generally circular ring-shaped sealing member, it will be apparent to those skilled in the art from this disclosure that sealing ring 510 does not need to be circularly shaped, as shown. In other words, it will be apparent to those skilled in the art from this disclosure that sealing ring 510 can have other non-circular ring shapes. For example, sealing ring 510 can be a rectangular ring-shaped sealing member (e.g., see FIG. 9). Other shapes for sealing ring 510 include an oval or race-track shape, a square shape, a rectangular shape, a polygon shape, or any other annular shape.

Sealing ring 510 has a pair of annular sealing surfaces that form an annular sealing plane S. Preferably, annular sealing plane S is concentrically mounted about the central longitudinal axis A of sealing ring 510. Annular sealing plane S is formed by the curved sections that are position adjacent the free ends of the first and second end sections 514 and 516 as discussed below. In other words, sealing ring 510 can be used to create seal between either a pair of angled surfaces (see FIG. 17) or a pair of parallel surfaces (FIG. 20) if the ends are modified to be curved ends as in sealing ring 210' discussed above.

In this embodiment, annular center section 512 has a single convolution. Of course, it will be apparent to those skilled in the art from this disclosure that sealing ring 510 can be formed with two or more convolutions (see FIG. 32). Basically, annular center section 512 has a curved bight portion 530 and a pair of straight portions 532 and 534 that form a substantially U-shaped cross-sectional profile. Annular center section 512 provides sealing ring 510 with a predetermined amount of controlled axial deflection during axial loading of sealing ring 510.

Preferably, annular center section 512 is designed with a relatively large radius of curvature with the straight portions 532 and 534 diverge away from each other as they approach the first and second end sections 514 and 516, respectively. Straight portions 532 and 534 are connected to first end section 514 and second end section 516 by a pair of curved portions 536 and 538. Accordingly, a first end of annular center section 512 is coupled to first end section 514 by curved end portion 536, while a second end of annular center section 512 is coupled to second end section 516 via curved end portion 538. Preferably, center section 512 and first and second end sections 514 and 516 have substantially smooth inner and outer surfaces, i.e., without any sharp bends formed therein. In this embodiment, the center section 512 lies on the inside of sealing ring 510 relative to first and second end sections 514 and 516. In other words, the convex surface of center section 512 faces away from the center axis A of sealing ring 510.

Preferably, first and second end sections 514 and 516 are substantially identical, except that first end section 514 is a mirror image of second end section 516. First end section 514 extends substantially axially from center section 512 in a first axial direction. Basically, as viewed in cross-section in FIG. 28, first end section 514 includes a first axially extending leg or straight portion 540, a curved portion 542 and an end portion 544. The free end of first end section 514 forms an edge surface 546. In this embodiment, leg portion 540 is concentrically arranged about annular sealing plane S. The axial length of leg portion 540 depends on the size of the sealing ring and the space to be sealed between the first and second members 518 and 520. At low load conditions, leg portion 540 will not buckle when a load is applied to sealing ring 510. Rather, in the first end section 514 of sealing ring 510, the load will cause curved portion 542 of first end section 514 to bend during loading of sealing ring 510.

End portion 544 is preferably a conically-shaped annular surface that is deflected towards center section 512 during loading. In the illustrated embodiment, the conically-shaped annular surface of end portion 544 is arranged to form a 20° angle with center plane C of sealing ring 510. In this embodiment, end portion 544 lies on the same side of leg portion 540 as center section 512. In other words, end portion 544 extends towards central axis A relative to leg portion 540.

Second end section 516 extends substantially axially from center section 512 in a second axial direction (opposite of the first axial direction of first end section 514). Basically, as viewed in cross-section in FIG. 28, second end section 516 includes an axially extending leg or straight portion 550, a curved portion 552 and an end portion 554. The free end of second end section 516 forms an edge surface 556. In this embodiment, leg portion 550 is concentrically arranged about annular sealing plane S. The axial length of leg portion 550 depends on the size of the sealing ring 510 and the space to be sealed between the first and second members 518 and 520. At low load conditions, leg portion 550 will not buckle when a load is applied to sealing ring 510. Rather, in the second end section 516 of sealing ring 510, the load will cause curved portion 552 of second end section 516 to bend during loading of sealing ring 510.

End portion 554 is preferably a conically-shaped annular surface that is deflected towards center section 512 during loading. In the illustrated embodiment, the conically-shaped annular surface of end portion 554 is arranged to form a 20° angle with center plane C of sealing ring 510. In this embodiment, end portion 554 lies on the same side of leg portion 550 as center section 512. In other words, end portion 554 extends towards central axis A relative to leg portion 550.

Sealing ring 510 of the present invention is designed such that deflection of the seal is controlled, i.e., there is no uncontrolled buckling of the end sections 514 and 516 and the end sections 514 and 516 can accommodate a range of deflection with little change in loading.

Sealing ring 510 can be constructed of a single ply, two plies or a single ply with a coating applied thereto depending on the material of the base ply and the sealing application. Specifically, when sealing ring 510 is utilized in a low load condition, the materials forming sealing ring 510 should be such that the seal deforms to create a seal. For example, sealing ring 510 can include a base ply or material formed of a high strength alloy, such as stainless steel, Inconel 718, or Inconel X-750, with a second ply of a relatively softer material, such as aluminum that overlies the base material (see FIG. 29).

Alternatively, the second ply can be replaced with a soft or smearable coating material (see FIG. 31). The coating can be constructed of relatively soft metals, such as tin, nickel, or the like, or any other suitable material, such as an elastomer or the like. If a metal coating is applied, the coating can be applied by electro-depositing, or the like, or any other suitable metal coating process.

Eleventh Embodiment

Figure 29:
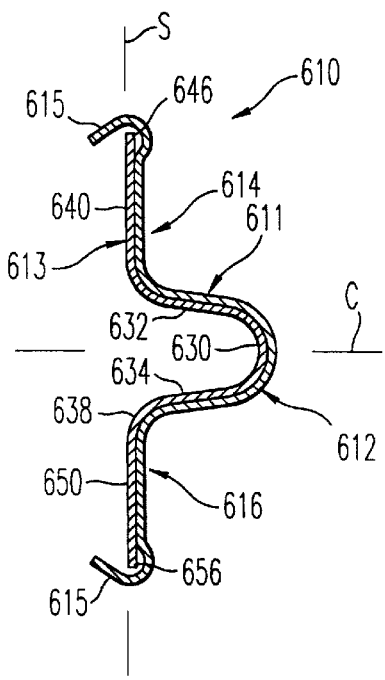
FIG. 29 is a diagrammatic cross-sectional view of a seal or sealing ring in accordance with an eleventh embodiment of the present invention.

Referring now to FIG. 29, a metallic sealing ring 610 in accordance with an eleventh embodiment of the present invention is illustrated. Sealing ring 610 is a modified version of the sealing ring 210, discussed above. Sealing ring 610 can be used in a vacuum process or a pneumatic process. Specifically, sealing ring 610 has been modified from sealing ring 210 in that the free ends have been modified and a second ply 611 of softer material has been added to the base material 613. In this embodiment, a gap is formed between the ends of the plies 611 and 613. In pneumatic applications, this gap should face away from the high pressure working fluid to prevent the plies from separating. In vacuum applications, this gap should face away from a vacuum process since small areas are undesirable. In view of the similarities between sealing rings 210 and 610, sealing ring 610 will not be discussed or illustrated in detail herein. In other words, the various materials, the dimensions, the applications, and other features of this embodiment are identical or substantially identical to the prior and subsequent sealing rings of the present invention unless otherwise stated.

Sealing ring 610 has a base layer or material 613 formed of a one-piece, unitary sheet of material that is shaped to form center section 612, first end section 614 and second end section 616. The second ply 611 is also formed of a one-piece, unitary sheet of material that is shaped to overlie one of the axial sides of the base material 613 and form part of center section 612, first end section 614 and second end section 616 of the base material 613. Preferably, the base material 613 and the second ply 611 are simultaneously formed with end portions 615 of the second ply 611 overlying the free ends of the base material 613.

Preferably, the base material 613 has a substantially uniform thickness ranging from about 0.010 inch to about 0.020 inch. The second ply 611 also has a substantially uniform thickness, which is equal to or thinner than the base material 613. Of course, the thicknesses of the second ply 611 and the base material 613 can be any suitable thickness depending on the type of material and the application for which the sealing ring 610 is to be used.

When sealing ring 610 is utilized in a low load condition, the materials forming sealing ring 610 should be such that the seal deforms to create a high integrity seal. The base ply or material 613 is preferably formed of a high strength alloy, such as stainless steel, Inconel 718, or Inconel X-750, with the second ply 613 being formed of a relatively softer material, such as aluminum that overlies the base material 613.

Sealing ring 610 can have a variety of shapes. For example, sealing ring 610 can be as a generally circular ring-shaped sealing member, (e.g., see FIG. 16) or a rectangular ring-shaped sealing member (e.g., see FIG. 9). Other shapes for sealing ring 610 include an oval or race-track shape, a square shape, a rectangular shape, a polygon shape, or any other annular shape.

Sealing ring 610 has a pair of annular sealing surfaces that form annular sealing plane S. Preferably, annular sealing plane S is concentrically mounted about the central longitudinal axis of sealing ring 610. Annular sealing plane S is formed at the free edges of the first and second end sections 614 and 616. When an axial force is applied to sealing ring 610, the end portions 615 of the second ply 611 that overlie the free ends of the base material 613 are plastically deformed as well as the center section 612.

In this embodiment, annular center section 612 has a single convolution. Of course, it will be apparent to those skilled in the art from this disclosure that sealing ring 610 can be formed with two or more convolutions (see FIG. 32). Basically, annular center section 612 has a curved bight portion 630 and a pair of straight portions 632 and 634 that form a substantially U-shaped cross-sectional profile. Annular center section 612 provides sealing ring 610 with a predetermined amount of controlled axial deflection during axial loading of sealing ring 610.

Preferably, annular center section 612 is designed with a relatively large radius of curvature with the straight portions 632 and 634 diverge away from each other as they approach the first and second end sections 614 and 616, respectively. A pair of curved portions 636 and 638 connects straight portions 632 and 634 to the first and second end sections 614 and 616. Accordingly, a first end of annular center section 612 is coupled to first end section 614 by curved end portion 636, while a second end of annular center section 612 is coupled to second end section 616 via curved end portion 638. Preferably, center section 612 and first and second end sections 614 and 616 have substantially smooth inner and outer surfaces, i.e., without any sharp bends formed therein. It will be apparent to those skilled in the art from this disclosure that center section 612 can extend either inwardly or outwardly from sealing ring 610 relative to first and second end sections 614 and 616 as seen in prior embodiments.

Preferably, first and second end sections 614 and 616 are substantially identical, except that first end section 614 is a mirror image of second end section 616. First end section 614 extends substantially axially from center section 612 in a first axial direction. Basically, first end section 614 is an axially extending straight portion with a free end that forms an edge sealing surface 646. In this embodiment, leg portion 640 is concentrically arranged about annular sealing plane S. The axial length of leg portion 640 depends on the size of the sealing ring and the space to be sealed between the first and second members 618 and 620. At low load conditions, leg portion 640 will not buckle when a load is applied to sealing ring 610.

Second end section 616 extends substantially axially from center section 612 in a second axial direction (opposite of the first axial direction of first end section 614). Basically, second end section 616 is an axially extending straight portion with a free end that forms an edge sealing surface 656. In this embodiment, leg portion 650 is concentrically arranged about annular sealing planes S. The axial length of leg portion 650 depends on the size of the sealing ring 610 and the space to be sealed between the first and second members. At low load conditions, leg portion 650 will not buckle when a load is applied to sealing ring 610.

Sealing ring 610 is designed to provide an extremely tight seal between a pair of opposing members such as on the order of $1\times10^{-9}$ scc/s He leakage rate or better. Sealing ring 610 is designed to accommodate various seal cavity tolerances. Sealing ring 610 of the present invention is designed such that deflection of the seal is controlled, i.e., there is no uncontrolled buckling of the end sections 614 and 616 and the end sections 614 and 616 can accommodate a range of deflection with little change in loading.

Alternatively, the second ply 611 can be replaced with a soft or smearable coating material (see FIG. 31). The coating can be constructed of relatively soft metals, such as tin, nickel, or the like, or any other suitable material, such as an elastomer or the like. If a metal coating is applied, the coating can be applied by electro-depositing, or the like, or any other suitable metal coating process.

In any case, the high quality sealing dams prevent leakage of fluid on a molecular level (i.e., having a leak rate of less than $1\times10^{-9}$ scc/s He at pressures up to at least 100 psi He, and providing a vacuum or pressure tight connection at $1\times10^{-10}$ torr pressure levels). However, the leak rate could be more than $1\times10^{-9}$ scc/s He at pressures up to at least 100 psi (e.g., $1\times10^{-7}$ scc/s He at pressures up to at least 100 psi) if such a low leak rate is not necessary. Furthermore, it is noted that these high quality sealing dams are created at relatively low load forces, ranging upwardly to 40 pci.

Twelfth Embodiment

Figure 30:
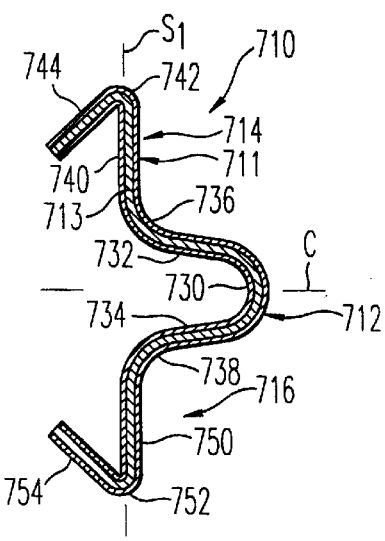
FIG. 30 is a diagrammatic cross-sectional view of a seal or sealing ring in accordance with a twelfth embodiment of the present invention.

Referring now to FIG. 30, a metallic sealing ring 710 in accordance with a twelfth embodiment of the present invention is illustrated. Sealing ring 710 is a modified version of the sealing ring 210 illustrated in the sixth embodiment and can be used in either a vacuum process or a pneumatic process. Specifically, the free ends of this embodiment have been modified such that the free ends are folded over to form curved edge sealing surfaces that are axially aligned with the straight portions. The folded free ends supply additional axial support during compression of sealing ring 210. Also a coating 711 has been applied over the base material 713. In view of the similarities between sealing rings 210 and 710, sealing ring 710 will not be discussed or illustrated in detail herein. In other words, the various materials, the dimensions, the applications, and other features of this embodiment are identical or substantially identical to the prior and subsequent sealing rings of the present invention unless otherwise stated.

Base layer or material 713 is formed of a one-piece, unitary sheet of material that is shaped to form center section 712, first end section 714 and second end section 716. Preferably, this base material 713 has a substantially uniform thickness ranging from about 0.010 inch to about 0.020 inch. Of course, the thickness of the base material 713 of sealing ring 710 can be any suitable thickness depending on the type of material and the application for which the sealing ring 710 is to be used.

A soft or smearable coating material 711 overlies the base material 713. The coating material 711 can be constructed of relatively soft metals, such as tin, nickel, or the like, or any other suitable material, such as an elastomer or the like. If a metal coating is applied, the coating material 711 can be applied by electro-depositing, or the like, or any other suitable metal coating process. The coating material 711 generally has a thickness within the range of about 0.001 inch to about 0.006 inch. However, the coating material 711 can have any suitable thickness, depending on the application in which the sealing ring 710 is to be used. Furthermore, the thickness of the coating material 711 can vary at different locations on the base material 713. For example, due to an end effect that occurs with an electro-depositing process, the coating thickness can be greater at the distal ends of the base material 713.

Sealing ring 710 preferably has a generally circular ring-shaped sealing member. Of course, it will be apparent to those skilled in the art from this disclosure that sealing ring 710 can have other non-circular ring shapes. For example, sealing ring 710 can be a rectangular ring-shaped sealing member (e.g., see FIG. 9). Other shapes for sealing ring 710 include an oval or race-track shape, a square shape, a rectangular shape, a polygon shape, or any other annular shape.

In this embodiment, annular center section 712 has a single convolution. Of course, it will be apparent to those skilled in the art from this disclosure that sealing ring 710 can be formed with two or more convolutions (see FIG. 32). Basically, annular center section 712 has a curved bight portion 730 and a pair of straight portions 732 and 734 that form a substantially U-shaped cross-sectional profile. Annular center section 712 provides sealing ring 710 with a predetermined amount of controlled axial deflection during axial loading of sealing ring 710.

Preferably, annular center section 712 is designed with a relatively large radius of curvature with the straight portions 732 and 734 diverge away from each other as they approach the first and second end sections 714 and 716, respectively. Straight portions 732 and 734 are connected to first end section 714 and second end section 716 by a pair of curved portions 736 and 738. Accordingly, a first end of annular center section 712 is coupled to first end section 714 by a curved end portion 736, while a second end of annular center section 712 is coupled to second end section 716 via curved end portion 738. Preferably, center section 712 and first and second end sections 714 and 716 have substantially smooth inner and outer surfaces, i.e., without any sharp bends formed therein. It will be apparent to those skilled in the art from this disclosure that center section 712 can extend either inwardly or outwardly from sealing ring 710 relative to first and second end sections 714 and 716 as seen in prior embodiments.

Preferably, first and second end sections 714 and 716 are substantially identical, except that first end section 714 is a mirror image of second end section 716. First end section 714 extends substantially axially from center section 712 in a first axial direction. Basically, first end section 714 includes a first axially extending leg or straight portion 740, a curved portion 742 and an end portion 744. In this embodiment, leg portion 740 is concentrically arranged about annular sealing plane $S_1$. The axial length of leg portion 740 depends on the size of the sealing ring and the space to be sealed between the first and second members 718 and 720. At low load conditions, leg portion 740 will not buckle when a load is applied to sealing ring 710.

The curved portions 742 and 752 are preferably each formed with a radius that is as tight as possible. For example, the radiuses of the curved portions 742 and 752 can be approximately one or two times the thickness of the base material for sealing ring 710. In other words, the end portions 744 and 754 can be bent to lie substantially parallel to or substantially against leg portions 740 and 750.

End portion 744 is preferably a conically-shaped annular surface that extends inwardly towards the center plane C. Of course, end portion 744 can be bent to be substantially parallel to center plane C or substantially against leg portion 740. End portion 744 preferably lies on the opposite side of leg portion 740 as center section 712. End portion 744 provides additional axial support for leg portion 740.

Second end section 716 extends substantially axially from center section 712 in a second axial direction (opposite of the first axial direction of first end section 714). Basically, second end section 716 includes an axially extending leg or straight portion 750, a curved portion 752 and an end portion 754. In this embodiment, leg portion 750 is concentrically arranged about annular sealing plane S. The axial length of leg portion 750 depends on the size of the sealing ring 710 and the space to be sealed between the first and second members 718 and 720. At low load conditions, leg portion 750 will not buckle when a load is applied to sealing ring 710.

End portion 754 is preferably a conically-shaped annular surface that extends inwardly toward the center plane C. Of course, end portion 754 can be bent to be substantially parallel to center plane C or substantially against leg portion 750. End portion 754 preferably lies on the opposite side of leg portion 750 as center section 712. End portion 754 provides additional axial support for leg portion 750.

Sealing ring 710 is designed to provide an extremely tight seal between a pair of opposing members such as on the order of $1\times10^{-9}$ scc/s He leakage rate or better. Sealing ring 710 is designed to accommodate various seal cavity tolerances. Sealing ring 710 of the present invention is designed such that deflection of the seal is controlled, i.e., there is no uncontrolled buckling of the end sections 714 and 716 and the end sections 714 and 716 can accommodate a range of deflection with little change in loading.

Alternatively, the coating 711 can be replaced with a second ply. Specifically, when sealing ring 710 is utilized in a low load condition, the materials forming sealing ring 710 should be such that the seal deforms to create a high integrity seal. For example, sealing ring 710 can include a base ply or material formed of a high strength alloy, such as stainless steel, Inconel 718, or Inconel X-750, with a second ply of a relatively softer material, such as aluminum that overlies the base material.

In any case, the high quality sealing dams prevent leakage of fluid on a molecular level (i.e., having a leak rate of less than $1\times10^{-9}$ scc/s He at pressures up to at least 100 psi He, and providing a vacuum or pressure tight connection at $1\times10^{-10}$ torr pressure levels). However, the leak rate could be more than $1\times10^{-9}$ scc/s He at pressures up to at least 100 psi (e.g., $1\times10^{-7}$ scc/s He at pressures up to at least 100 psi) if such a low leak rate is not necessary. Furthermore, it is noted that these high quality sealing dams are created at relatively low load forces, ranging upwardly to 40 pci.

Thirteenth Embodiment

Referring now to FIG. 31, a metallic sealing ring 810 in accordance with a thirteenth embodiment of the present invention is illustrated. Basically, sealing ring 810 is substantially identical to sealing ring 210, discussed above, except that all the surfaces of sealing ring 810 have been coated with a soft coating material 811. Of course, the ends of sealing ring 810 can be modified to have curved ends that are the same as shown in the sealing ring 210'. In view of the similarities between sealing rings 210 and 810, sealing ring 810 will not be discussed or illustrated in detail herein. In other words, the various materials, the dimensions, the applications, and other features of this embodiment are identical or substantially identical to the prior and subsequent sealing rings of the present invention unless otherwise stated.

Sealing ring 810 has a base layer or material 813 formed of a one-piece, unitary sheet of material that is shaped to form center section 812, first end section 814 and second end section 816. Preferably, this base material 813 has a substantially uniform thickness ranging from about 0.010 inch to about 0.020 inch. Of course, the thickness of the base material 813 of sealing ring 810 can be any suitable thickness depending on the type of material and the application for which the sealing ring 810 is to be used.

A soft or smearable coating material 811 overlies the base material 813. The coating material 811 can be constructed of relatively soft metals, such as tin, nickel, or the like, or any other suitable material, such as an elastomer or the like. If a metal coating is applied, the coating material 811 can be applied by electro-depositing, or the like, or any other suitable metal coating process. The coating material 811 generally has a thickness within the range of about 0.001 inch to about 0.006 inch. However, the coating material 811 can have any suitable thickness, depending on the application in which the sealing ring 810 is to be used. Furthermore, the thickness of the coating material 811 can vary at different locations on the base material 813. For example, due to an end effect that occurs with an electro-depositing process, the coating thickness can be greater at the distal ends of the base material 813.

Sealing ring 810 preferably has a generally circular ring-shaped sealing member. Of course, it will be apparent to those skilled in the art from this disclosure that sealing ring 810 can have other non-circular ring shapes. For example, sealing ring 810 can be a rectangular ring-shaped sealing member (e.g., see FIG. 9). Other shapes for sealing ring 810 include an oval or race-track shape, a square shape, a rectangular shape, a polygon shape, or any other annular shape.

Sealing ring 810 has a pair of annular sealing surfaces that form an annular sealing plane S. Preferably, annular sealing plane S is concentrically mounted about the central longitudinal axis of sealing ring 810. Annular sealing plane S is formed by the curved sections that are position adjacent the free ends of the first and second end sections 814 and 816 as discussed below. In other words, sealing ring 810 can be used to create seal between either a pair of angled surfaces (see FIG. 17) or a pair of parallel surfaces (see FIG. 20) if the free ends are modified to be curved ends as in sealing ring 210' discussed above.

In this embodiment, annular center section 812 has a single convolution. Of course, it will be apparent to those skilled in the art from this disclosure that sealing ring 810 can be formed with two or more convolutions (see FIG. 32). Basically, annular center section 812 has a curved bight portion 830 and a pair of straight portions 832 and 834 that form a substantially U-shaped cross-sectional profile. Annular center section 812 provides sealing ring 810 with a predetermined amount of controlled axial deflection during axial loading of sealing ring 810.

Preferably, annular center section 812 is designed with a relatively large radius of curvature with the straight portions 832 and 834 diverge away from each other as they approach the first and second end sections 814 and 816, respectively. A pair of curved portions 836 and 838 connects straight portions 832 and 834 to first end section 814 and second end section 816. Accordingly, a first end of annular center section 812 is coupled to first end section 814 by curved end portion 836, while a second end of annular center section 812 is coupled to second end section 816 via curved end portion 838. Preferably, center section 812 and first and second end sections 814 and 816 have substantially smooth inner and outer surfaces, i.e., without any sharp bends formed therein. It will be apparent to those skilled in the art from this disclosure that center section 812 can extend either inwardly or outwardly from sealing ring 810 relative to first and second end sections 814 and 816 as seen in prior embodiments.

Preferably, first and second end sections 814 and 816 are substantially identical, except that first end section 814 is a mirror image of second end section 816. First end section 814 extends substantially axially from center section 812 in a first axial direction. Basically, first end section 814 includes a first axially extending leg or straight portion 840, a curved portion 842 and an end portion 844. The free end of first end section 814 forms an edge surface 846. In this embodiment, leg portion 840 is concentrically arranged about annular sealing plane S. The axial length of leg portion 840 depends on the size of the sealing ring and the space to be sealed between the first and second members 818 and 820.

End portion 844 is preferably a conically-shaped annular surface that is deflected towards center section 812 during loading. In the illustrated embodiment, the conically-shaped annular surface of end portion 844 is arranged to form a 20° angle with center plane C of sealing ring 810. In this embodiment, end portion 844 lies on the same side of leg portion 840 as center section 812.

Second end section 816 extends substantially axially from center section 812 in a second axial direction (opposite of the first axial direction of first end section 814). Basically, second end section 816 includes an axially extending leg or straight portion 850, a curved portion 852 and an end portion 854. The free end of second end section 816 forms an edge surface 856. In this embodiment, leg portion 850 is concentrically arranged about annular sealing plane S. The axial length of leg portion 850 depends on the size of the sealing ring 810 and the space to be sealed between the first and second members 818 and 820.

End portion 854 is preferably a conically-shaped annular surface that is deflected towards center section 812 during loading. In the illustrated embodiment, the conically-shaped annular surface of end portion 854 is arranged to form a 20° angle with center plane C of sealing ring 810. In this embodiment, end portion 854 lies on the same side of leg portion 850 as center section 812.

Sealing ring 810 is designed to accommodate various seal cavity tolerances. Sealing ring 810 of the present invention is designed such that deflection of the seal is controlled, i.e., there is no uncontrolled buckling of the end sections 814 and 816 and the end sections 814 and 816 can accommodate a range of deflection with little change in loading.

Fourteenth Embodiment

Figure 32:
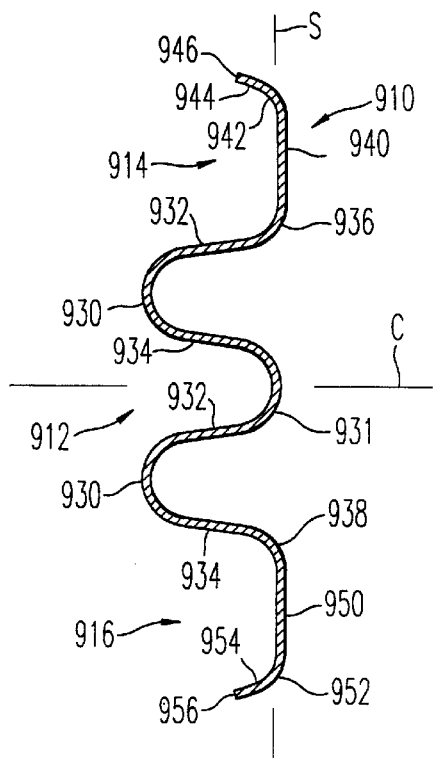
FIG. 32 is a diagrammatic cross-sectional view of a seal or sealing ring illustrated in accordance with a fourteenth embodiment of the present invention.

Referring now to FIG. 32, a metallic sealing ring 910 in accordance with a fourteenth embodiment of the present invention is illustrated. Basically, sealing ring 910 is substantially identical to sealing ring 210, discussed above, except that the center section is provided with multiple convolutions. While only two convolutions are shown, it will be apparent to those skilled in the art from this disclosure that more than two convolutions can be utilized, as needed and/or desired. Of course, the ends of sealing ring 910 can be modified to have curved ends that are the same as shown in the sealing ring 210'. In view of the similarities between sealing rings 210 and 910, sealing ring 910 will not be discussed or illustrated in detail herein. In other words, the various materials, the dimensions, the applications, and other features of this embodiment are identical or substantially identical to the prior and subsequent sealing rings of the present invention unless otherwise stated.

Sealing ring 910 has a base layer or material formed of a one-piece, unitary sheet of material that is shaped to form center section 912, first end section 914 and second end section 916. Sealing ring 910 preferably has a generally circular ring-shaped sealing member. Of course, it will be apparent to those skilled in the art from this disclosure that sealing ring 910 can have other non-circular ring shapes. For example, sealing ring 910 can be a rectangular ring-shaped sealing member (e.g., see FIG. 9). Other shapes for sealing ring 910 include an oval or race-track shape, a square shape, a rectangular shape, a polygon shape, or any other annular shape.

Sealing ring 910 has a pair of annular sealing surfaces that form an annular sealing plane S. Preferably, annular sealing plane S is concentrically mounted about the central longitudinal axis of sealing ring 910. Annular sealing plane S is formed by the curved sections that are position adjacent the free ends of the first and second end sections 914 and 916 as discussed below. In other words, sealing ring 910 can be used to create seal between either a pair of angled surfaces (see FIG. 17) or a pair of parallel surfaces (see FIG. 20) if the ends are modified to be curved ends as in sealing ring 210' discussed above.

Basically, annular center section 912 has a pair of curved bight portions 930 with each bight portion having a pair of straight portions 932 and 934 that form a pair of substantially U-shaped cross-sectional profiles connected together by a curved portion 931. The center section 912 provides sealing ring 910 with a predetermined amount of controlled axial deflection during axial loading of sealing ring 910.

Preferably, curved bight portions 930 are each designed with a relatively large radius of curvature with the straight portions 932 and 934 diverge away from each other. One of the straight portions 932 is connected to first end section 914 by a curved portion 936 and one of the straight portions 932 is connected to second end section 914 by a curved portion 938. The other of the straight portions 932 and 934 are coupled together by curved portion 931 and 938. Accordingly, a first end of annular center section 912 is coupled to first end section 914 by curved end portion 936, while a second end of annular center section 912 is coupled to second end section 916 via curved end portion 938. Preferably, center section 912 and first and second end sections 914 and 916 have substantially smooth inner and outer surfaces, i.e., without any sharp bends formed therein. It will be apparent to those skilled in the art from this disclosure that center section 912 can extend either inwardly or outwardly from sealing ring 910 relative to first and second end sections 914 and 916 as seen in prior embodiments.

Preferably, first and second end sections 914 and 916 are substantially identical, except that first end section 914 is a mirror image of second end section 916. First end section 914 extends substantially axially from center section 912 in a first axial direction. Basically, first end section 914 includes a first axially extending leg or straight portion 940, a curved portion 942 and an end portion 944. The free end of first end section 914 forms an edge surface 946. In this embodiment, leg portion 940 is concentrically arranged about annular sealing plane S. The axial length of leg portion 940 depends on the size of the sealing ring and the space to be sealed between the first and second members 918 and 920.

End portion 944 is preferably a conically-shaped annular surface that is deflected towards center section 912 during loading. In the illustrated embodiment, the conically-shaped annular surface of end portion 944 is arranged to form a 20° angle with center plane C of sealing ring 910. In this embodiment, end portion 944 lies on the same side of leg portion 940 as center section 912.

Second end section 916 extends substantially axially from center section 912 in a second axial direction (opposite of the first axial direction of first end section 914). Basically, second end section 916 includes an axially extending leg or straight portion 950, a curved portion 952 and an end portion 954. The free end of second end section 916 forms an edge surface 956. In this embodiment, leg portion 950 is concentrically arranged about annular sealing plane S. The axial length of leg portion 950 depends on the size of the sealing ring 910 and the space to be sealed between the first and second members 918 and 920.

End portion 954 is preferably a conically-shaped annular surface that is deflected towards center section 912 during loading. In the illustrated embodiment, the conically-shaped annular surface of end portion 954 is arranged to form a 20° angle with center plane C of sealing ring 910. In this embodiment, end portion 954 lies on the same side of leg portion 950 as center section 912.

Sealing ring 910 is designed to accommodate various seal cavity tolerances. Sealing ring 910 of the present invention is designed such that deflection of the seal is controlled, i.e., there is no uncontrolled buckling of the end sections 914 and 916 and the end sections 914 and 916 can accommodate a range of deflection with little change in loading.

Sealing ring 910 can be constructed of a single ply, two plies or a single ply with a coating applied thereto depending on the material of the base ply and the sealing application. When sealing ring 910 is utilized in a low load condition, the materials forming sealing ring 910 should be such that the seal deforms to create a seal. For example, sealing ring 910 can include a base material formed of a high strength alloy, such as stainless steel, Inconel 718, or Inconel X-750, with a second ply of a relatively softer material, such as aluminum that overlies the base material (see FIG. 29). Alternatively, the second ply can be replaced with a soft or smearable coating material (see FIG. 31). The coating can be constructed of relatively soft metals, such as tin, nickel, or the like, or any other suitable material, such as an elastomer or the like. If a metal coating is applied, electro-depositing, or the like, or any other suitable metal coating process can be used to apply the coating.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments of the present invention are provided for illustration only, and not for the purpose of limiting the invention as defined by the appended claims and their equivalents.

What is claimed is:

1. A sealing ring for low load conditions, comprising:
   an annular center section having a first end, a second end and a curved bight portion located between said first and second ends of said center section;
   a first annular end section extending from said first end of said center section, said first annular end section having a first leg portion extending axially from said first end of said center section with a first sealing surface formed at its outer axial end, said first leg portion being straight in cross-section and parallel to a main central axis of said sealing ring to avoid uncontrolled buckling in said first leg portion; and
   a second annular end section extending from said second end of said center section, said second annular end section having a second leg portion extending axially from said second end of said center section with a second sealing surface formed at its outer axial end, said second leg portion being straight in cross-section and parallel to said main central axis of said sealing ring to avoid uncontrolled buckling in said second leg portion.

2. A sealing ring according to claim 1, wherein
   said first and second annular end sections have free ends with first and second end edges forming said first and second sealing surfaces, respectively, said first sealing surface facing in a first direction substantially parallel to said main central axis of said sealing ring and said second sealing surface facing in a second direction substantially parallel to said main central axis of said sealing ring.

3. A sealing ring according to claim 2, wherein
   said first and second sealing surfaces lie in a plane that is substantially parallel to said first and second leg portions.

4. A sealing ring according to claim 2, wherein said free ends of said first and second end sections further include first and second conical portions, respectively.

5. A sealing ring according to claim 2, wherein said sealing ring has an outer diameter, an inner diameter, a cross-sectional width and an axial height, said height is greater than said cross-sectional width.

6. A sealing ring according to claim 2, wherein said first and second annular end sections further includes a first curved portion located between said first leg portion and said first sealing surface, and a second curved portion located between said second leg portion and said second sealing surface.

7. A sealing ring according to claim 6, wherein said free ends of said first and second annular end sections further include a first conical portion located between said first curved portion and said first sealing surface, and a second conical portion located between said second curved portion and said second sealing surface.

8. A sealing ring according to claim 7, wherein said annular central section, said first and second annular end sections are formed by a base material having a coating material overlying said first and second sealing surfaces, said coating material being a softer than said base material.

9. A sealing ring according to claim 8, wherein said annular central section lies radially outwardly relative to said first and second leg portions.

10. A sealing ring according to claim 9, wherein said first and second conical portions lie radially inwardly relative to said first and second leg portions.

11. A sealing ring according to claim 10, wherein said annular central section, said first and second annular end sections are formed by a base material having a coating material overlying said first and second sealing surfaces, said coating material being a softer than said base material.

12. A sealing ring according to claim 9, wherein said first and second conical portions lie radially outwardly relative to said first and second leg portions.

13. A sealing ring according to claim 12, wherein said annular central section and said first and second annular end sections are formed by a base material having inner and outer axial surfaces extending between first and second axial free ends of said sealing ring, and further comprising a coating material overlying at least one of said inner and outer axial surfaces and said first and second axial free ends, said coating material being a softer than said base material.

14. A sealing ring according to claim 13, wherein said coating material is a sheet material that is deformed to overlie at least one of said inner and outer axial surfaces and said first and second axial free ends.

15. A sealing ring according to claim 13, wherein said coating material is a coating that is bonded to overlie said inner and outer axial surfaces and said first and second axial free ends.

16. A sealing ring according to claim 7, wherein said annual central section lies radially inwardly relative to said first and second leg portions.

17. A sealing ring according to claim 16, wherein said first and second conical portions lie radially inwardly relative to said first and second leg portions.

18. A sealing ring according to claim 10, wherein said central section, said first and second end annular sections are formed by a base material having a coating material overlying said first and second sealing surfaces, said coating material being a softer than said base material.

19. A sealing ring according to claim 16, wherein said first and second conical portions lie radially outwardly relative to said first and second leg portions.

20. A sealing ring according to claim 19, wherein said annular central section, said first and second end annular sections are formed by a base material having a coating material overlying said first and second sealing surfaces, said coating material being a softer than said base material.

21. A sealing ring according to claim 1, wherein said first and second annular end sections further includes first and second curved portions forming said first and second sealing surfaces, respectively.

22. A sealing ring according to claim 21, wherein said first and second annular end sections further includes first and second conical portions extending from said first and second curved portions towards a center plane that bisects said annular central section.

23. A sealing ring according to claim 22, wherein said annular central section and said first and second annular end sections are formed by a base material having inner and outer axial surfaces extending between first and second axial free ends of said sealing ring, and further comprising a coating material overlying at least one of said inner and outer axial surfaces and said first and second axial free ends, said coating material being a softer than said base material.

24. A sealing ring according to claim 22, wherein said coating material is a coating that is bonded to overlie said inner and outer axial surfaces and said first and second axial free ends.

25. A sealing ring according to claim 1, wherein said first and second annular end sections further includes first and second conical portions, respectively, that lie radially inwardly relative to said first and second leg portions.

26. A sealing ring according to claim 1, wherein said first and second annular end sections further includes first and second conical portions, respectively, that lie radially outwardly relative to said first and second leg portions.

27. A sealing ring according to claim 1, wherein said annular central section includes more than one convolution.

28. A sealing ring according to claim 1, wherein said annular central section has only one convolution.

29. A sealing ring according to claim 1, wherein said annular central section and said first and second annular end sections are formed by a base material having inner and outer axial surfaces extending between first and second axial free ends of said sealing ring, and further comprising a coating material overlying at least one of said inner and outer axial surfaces and said first and second axial free ends, said coating material being a softer than said base material.

30. A sealing ring according to claim 29, wherein said coating material is a sheet material that is deformed to overlie at least one of said inner and outer axial surfaces and said first and second axial free ends.

31. A sealing ring according to claim 29, wherein said coating material is a coating that is bonded to overlie said inner and outer axial surfaces and said first and second axial free ends.

32. A sealing ring according to claim 29, wherein said first and second annular end sections has first and second curved portions forming said first and second sealing surfaces, respectively.

33. A sealing ring according to claim 29, wherein said first and second axial free ends are edges that are axially aligned with said first and second leg portions, respectively, said first sealing surface facing in a first direction substantially parallel to said main central axis of said sealing ring and said second sealing surface facing in a second direction substantially parallel to said main central axis of said sealing ring.

* * * * *